(12) United States Patent
Telfer et al.

(10) Patent No.: US 8,576,476 B2
(45) Date of Patent: Nov. 5, 2013

(54) MULTI-COLOR ELECTRO-OPTIC DISPLAYS

(75) Inventors: Stephen J. Telfer, Arlington, MA (US); Richard J. Paolini, Jr., Framingham, MA (US); Sunil Krishna Sainis, Malden, MA (US); Randall M. Hill, Ayer, MA (US); Isaac W. Moran, Amherst, MA (US); Lee Yezek, Watertown, MA (US); Alain Bouchard, Dorchester, MA (US); William Vetterling, Lexington, MA (US); George G. Harris, Woburn, MA (US); Hywel Morgan, Southampton (GB); Luke Slominski, Burlington, MA (US); Jay William Anseth, Cambridge, MA (US); Jennifer Quimby, Watertown, MA (US); Craig A. Herb, Medford, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 13/113,567

(22) Filed: May 23, 2011

(65) Prior Publication Data

US 2012/0008188 A1 Jan. 12, 2012

Related U.S. Application Data

(60) Provisional application No. 61/347,063, filed on May 21, 2010.

(51) Int. Cl.
*G02B 26/00* (2006.01)
*G02F 1/03* (2006.01)
*G09G 3/34* (2006.01)
*G03G 17/04* (2006.01)

(52) U.S. Cl.
USPC .............. 359/296; 359/245; 345/107; 430/32

(58) Field of Classification Search
USPC ......... 359/296, 245, 315, 247, 251–252, 254, 359/108, 237–238, 278–279, 290–292, 298, 359/300–302, 259; 385/1–3, 40, 129–132, 385/5, 8–9; 430/31–32; 345/49, 107; 349/33, 38
See application file for complete search history.

(56) References Cited

U.S. PATENT DOCUMENTS 3,668,106 A * 6/1972 Ota ............................... 358/305
4,418,346 A 11/1983 Batchelder
(Continued)

FOREIGN PATENT DOCUMENTS

| JP | 06-265854 | 9/1994 |
|---|---|---|
| JP | 2005-156759 | 6/2005 |
| JP | 2007-206145 | 8/2007 |

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Dawayne A Pinkney
(74) *Attorney, Agent, or Firm* — David J. Cole

(57) ABSTRACT

An electro-optic display comprising at least two separate layers of electro-optic material, with one of these layers being capable of displaying at least one optical state which cannot be displayed by the other layer. The display is driven by a single set of electrodes between which both layers are sandwiched, the two layers being controllable at least partially independently of one another. Another form of the invention uses three different types of particles within a single electrophoretic layer, with the three types of particles being arranged to shutter independently of one another.

23 Claims, 18 Drawing Sheets

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,271,823 B1 | 8/2001 | Gordon, II et al. |
| 6,301,038 B1 | 10/2001 | Fitzmaurice et al. |
| 6,392,785 B1 | 5/2002 | Albert et al. |
| 6,664,944 B1 | 12/2003 | Albert et al. |
| 6,672,921 B1 | 1/2004 | Liang et al. |
| 6,727,873 B2 | 4/2004 | Gordon, II et al. |
| 6,735,009 B2 | 5/2004 | Li |
| 6,788,449 B2 | 9/2004 | Liang et al. |
| 6,819,471 B2 * | 11/2004 | Amundson et al. ........... 359/296 |
| 6,864,875 B2 | 3/2005 | Drzaic et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,075,502 B1 | 7/2006 | Drzaic et al. |
| 7,109,968 B2 | 9/2006 | Albert et al. |
| 7,116,318 B2 | 10/2006 | Amundson et al. |
| 7,167,155 B1 | 1/2007 | Albert et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,391,555 B2 | 6/2008 | Albert et al. |
| 7,411,719 B2 | 8/2008 | Paolini, Jr. et al. |
| 7,420,549 B2 | 9/2008 | Jacobson et al. |
| 7,436,577 B2 * | 10/2008 | Moriyama et al. ........... 359/296 |
| 7,453,445 B2 | 11/2008 | Amundson |
| 7,535,624 B2 | 5/2009 | Amundson et al. |
| 7,667,684 B2 | 2/2010 | Jacobson et al. |
| 7,679,814 B2 | 3/2010 | Paolini et al. |
| 7,791,789 B2 | 9/2010 | Albert et al. |
| 7,839,564 B2 | 11/2010 | Whitesides et al. |
| 7,910,175 B2 | 3/2011 | Webber et al. |
| 7,952,790 B2 | 5/2011 | Honeyman et al. |
| 7,956,841 B2 | 6/2011 | Albert et al. |
| 7,999,787 B2 | 8/2011 | Amundson et al. |
| 8,009,348 B2 | 8/2011 | Zehner et al. |
| 8,098,418 B2 | 1/2012 | Paolini et al. |
| 2002/0171620 A1 * | 11/2002 | Gordon et al. ........... 345/107 |
| 2004/0263947 A1 | 12/2004 | Drzaic et al. |
| 2005/0124751 A1 | 6/2005 | Klingenberg et al. |
| 2007/0195399 A1 * | 8/2007 | Aylward et al. ........... 359/296 |
| 2008/0043318 A1 | 2/2008 | Whitesides et al. |
| 2008/0048970 A1 | 2/2008 | Drzaic et al. |
| 2008/0130092 A1 | 6/2008 | Whitesides et al. |
| 2009/0004442 A1 | 1/2009 | Danner |
| 2009/0225398 A1 | 9/2009 | Duthaler et al. |
| 2009/0237776 A1 | 9/2009 | Bouchard |
| 2010/0060628 A1 | 3/2010 | Lenssen et al. |
| 2010/0103502 A1 | 4/2010 | Jacobson et al. |
| 2010/0156780 A1 | 6/2010 | Jacobson et al. |

OTHER PUBLICATIONS

Foams: Theory, Measurements, and Applications, R. K. Prud'homme and S. A. Khan, eds., Marcel Dekker, Inc., 1996.

Hayes, R.A., et al., "Video-Speed Electronic Paper Based on Electrowetting", Nature, vol. 425, Sep. 25, pp. 383-385 (2003).

J. Heikenfeld, P., et al., Journal of the SID, 19(2), 2011, pp. 129-156.

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Todd Squires and Martin Bazant, J. Fluid Mech., (2004) 509, 217-252.

V. A. Murtsovkin, Colloid J., 58, 341-349 (1996).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

* cited by examiner

MULTI-COLOR ELECTRO-OPTIC DISPLAYS

REFERENCE TO RELATED APPLICATION

This application claims benefit of copending provisional Application Ser. No. 61/347,063, filed May 21, 2010. The entire disclosure of this provisional application is herein incorporated by reference.

BACKGROUND OF INVENTION

The present invention relates to multi-color electro-optic media and to displays incorporating such media.

The term "electro-optic", as applied to a material or a display, is used herein in its conventional meaning in the imaging art to refer to a material having first and second display states differing in at least one optical property, the material being changed from its first to its second display state by application of an electric field to the material. The optical property is typically color perceptible to the human eye.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Particle-based electrophoretic displays, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276 and; 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. Nos. 6,017,584; 6,664,944; 6,864,875; 7,075,502; 7,167,155; 7,667,684; and 7,791,789; and U.S. Patent Applications Publication Nos. 2004/0263947; 2007/0109219; 2007/0223079; 2008/0023332; 2008/0043318; 2008/0048970; 2008/0211764; 2009/0004442; 2009/0225398; 2009/0237776; 2010/0103502; 2010/0156780; and 2010/0225995;
(f) Methods for driving displays; see for example U.S. Pat. Nos. 7,012,600; and 7,453,445;
(g) Applications of displays; see for example U.S. Pat. No. 7,312,784; and U.S. Patent Application Publication No. 2006/0279527.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated (including polymer-dispersed) and microcell electrophoretic displays.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

As already indicated, an encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

There is today an increasing demand for color in all displays. Users familiar with color televisions, color computer displays and color displays on cellular telephones and other portable electronic devices may regard monochrome display as lacking something in visual appeal even in applications such as electronic book readers, where the display aims to reproduce the look of a printed book, most of which are still printed in monochrome.

In conventional printing, full color images of high quality are formed by providing sub-images in each of three subtractive primary colors, typically cyan, magenta and yellow ("CMY") (black may be included as a four primary in a "CMYK" system) that are overlaid (i.e., more than one color can be present at any point on the page) in such a way that light is filtered through each sub-image before being reflected back from the underlying white paper to the viewer. (Thus, a so-called "four color", CMYK system is in reality a five-color system; the white color of the underlying paper is part of the color formation system, as is readily appreciated from the fact that this white color appears where no ink whatever is present.) In this arrangement of three or four overlaid sub-images, no area of the printed paper absorbs light unnecessarily, and thus an image of maximum brightness is obtained.

Prior art electrophoretic and similar electro-optic displays have typically relied upon the use of reflective (light-scattering) pigments. Since no substantial amount of light passes through a layer of such pigment, it is not possible to overlay sub-images of differing colors, and in a color display it is necessary to resort to "color area sharing" to render a palette of colors. For example, multiple different sub-regions of the display may be provided with electrophoretic media capable of displaying different colors, for example red, green and blue. (Note that since there is no overlaying of sub-images of different colors, this type of display typically uses additive primaries rather than subtractive primaries.) Alternatively, a monochrome medium can be used and a color filter array provided so that specific pixels can reflect specific primary colors. Either approach suffers, however, from the problem that only a fraction of the area of the display is available for reflection of each primary color, which adversely affects the brightness of the image available. Hence, to improve the brightness of a color reflective display, it is desirable to provide a display which can display any desired color at any pixel of the display, and thereby to maximize the amount of light reflected to a viewer.

Multilayer, stacked electro-optic displays using are known in the prior art. In such displays, ambient light passes through sub-images in each of the three subtractive primary colors, in a manner analogous to conventional color printing. U.S. Pat. No. 6,727,873 describes a stacked electrophoretic display in which three layers of switchable cells are placed over a reflective background. Similar displays are known in which pigments are moved laterally; see for example International Application Publication No. WO 2008/065605 or, pigments in microcavities are moved using a combination of vertical and lateral motion. For a review of such displays, see J. Heikenfeld, P., et al., Journal of the SID, 19(2), 2011, pp. 129-156. In these prior art displays, each pixel of each layer must be capable of being driven independently so as to concentrate or disperse the pigment particles on a pixel-by-pixel basis. This requires three separate pair of electrodes, each of which typically comprises an active matrix backplane having a matrix of thin-film transistors, and an opposed continuous counter-electrode. Two of the active matrix backplanes must be as transparent as possible, as must be each counter-electrode. This approach suffers from the severe disadvantages of the high cost of manufacturing such a complex arrangement of electrodes, and from the fact that in the present state of the art it is difficult to provide an adequately transparent backplane, especially as the white state of the display requires that light pass through several layers of such transparent electrodes; in practice, the light losses in the electrodes have a severe adverse effect on the brightness of the image produced by the display.

Those skilled in the imaging art know that it is necessary to provide independent addressing of each primary color in order to render a full-color image. This is illustrated graphically in FIG. 1 of the accompanying drawings, which shows a "color cube" in which the vertices correspond to white, the three subtractive primary colors (yellow, magenta, and cyan), the three additive primary colors (red, green and blue) and black. As shown by the arrows, any point inside or on the surface of the color cube can be defined by three (orthogonal) co-ordinates, namely, the distances along the white-yellow axis, the white-magenta axis, and the white-cyan axis. These distances correspond to different optical densities in the subtractive primary colors, ranging from zero (i.e., white) to about 2 (corresponding 99% absorption of light of the corresponding additive primary spectral range). The number of discretely addressed independent states required to render the full color gamut of a display is the number of yellow states plus the number of magenta states plus the number of cyan states. The number of colors that can be rendered, however, is the product of these three numbers. Thus, for example, a display may be chosen to render 2 yellow states (since the human visual system is relatively insensitive to spatial variation in blue light, the absence of which corresponds to the yellow subtractive primary color) and $2^4=16$ states of each of magenta and cyan. The waveform driving the display would be required to render 34 different states in total, but would be able to address $2^9=512$ different colors.

In one aspect, this invention provides a color display in which a single pair of electrodes are used to address independently more than one layer of electrophoretic or similar electro-optic material. Such a color display can provide independent, or at least partially independent addressing of more than one primary color using a single pair or single set of electrodes (for example, the single set of electrodes can be an active matrix backplane and a single continuous counter-electrode. At least one of the layers of electrophoretic or similar material may operate in shutter mode (as defined above).

Shutter mode electrophoretic displays can be used as light modulators. Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

VT media capable of being used as VT windows have been demonstrated and are described in the patent literature; see, for example, U.S. Pat. No. 7,327,511; and U.S. Patent Applications Publication Nos. 2006/0038772; 2007/0146310; and 2008/0130092. However, there are certain remaining problems in such VT media. Firstly, it is difficult to achieve in the same medium acceptable levels of image stability (i.e., stable transmission) and haze. In practice, VT windows need high image stability of the order of several hours, since users do not wish to have their windows adjusting their transmission levels every few minutes. As discussed above (see the aforementioned U.S. Pat. No. 7,170,670), the image stability of electrophoretic media can be increased by dissolving or dispersing a high molecular weight polymer in the fluid in the fluid in which the electrophoretic particles (typically carbon black particles) are dispersed; the aforementioned 2007/0146310 recommends a polystyrene dispersed in a mixture of limonene and a partially hydrogenated terphenyl as a fluid for used in VT electrophoretic media. The effect of adding the polymer to the fluid is to increase the flocculation of the electrophoretic particles once the particles are aggregated together, and thus to increase the image stability. Unfortunately, the polymer also serves to increase particle flocculation even when the electrophoretic particles are intended to be dispersed throughout the fluid, and the resultant increase in particle aggregation and thus effective particle size, substantially increases the optical haze of the medium; the particle size of the aggregated particles is large enough to cause substantial scattering of visible light, even though the individual particles themselves are sufficiently small that they will cause little scattering. The light scattering responsible for haze depends upon both the particle size and the difference in refractive index between the electrophoretic particles and the surrounding fluid. To date, no black pigment has been identified which has a refractive index close enough to that of the fluids typically used in electrophoretic media (or close enough to that of the polymeric phase which typically surrounds the fluid, as discussed above) to reduce haze to an acceptable level, and no mechanism for increasing image stability to the degree considered desirable for commercial sale has been identified which does not increase haze to an undesirable level.

Another problem with prior art VT electrophoretic media (and similar electro-optic media such as electrochromic media) is their inability to vary hue; in other words, the colors capable of being displayed by such media fall on a line between their endpoint colors (a transparent state being regarded as a "color" for purposes of the present application), and the media do not have a color gamut volume. For example, the colors obtainable from the VT media described in the aforementioned U.S. Pat. No. 7,327,511; and U.S. Patent Applications Publication Nos. 2006/0038772; 2007/0146310; and 2008/0130092 vary from black to clear, while electrochromic media typically vary from blue-purple to clear. (Provision of color in VT media may be useful either in enabling the light within a room equipped with VT windows to be varied, or in enabling the use of VT as one layer in a multi-layer display, as discussed in detail below.) Neither type of media can produce additional colors without the addition of a color filter array, and the use of a multi-pixel drive method, typically using a passive or active matrix backplane. Such a backplane inevitably reduces optical transmission through the VT medium and is far more expensive than the simple electrode used in a single pixel VT display Accordingly, there is still a need for a VT medium which can provide the high image stability desirable in commercial VT displays in combination with low haze. There is also still a need for VT media which can provide a substantial color gamut. In one aspect, the present invention seeks to provide solutions to both these problems.

SUMMARY OF INVENTION

In one aspect, this invention provides an electro-optic display comprising at least first and second layers of electro-optic material, the first layer being capable of displaying at least one optical state which cannot be displayed by the second layer, the display further comprising a first electrode disposed on one side of the first and second layers, and a second electrode disposed on the opposed side of the first and second layers from the first electrode, there being no electrode between the first and second layers. (The term "electrode" is used herein in its conventional meaning in the electro-optic display art to mean a conductive material the electrical potential of which can be controlled by being connected to a source of known potential, including ground. Thus, for purposes of this application, a conductive material not arranged to be connected to any source of known potential is not an electrode.)

Such a display may further comprises a third layer of electro-optic material, the third layer being capable of displaying at least one optical state which cannot be displayed by the first and second layers, the second electrode being disposed on the opposed side of the first, second and third layers from the first electrode, there being no electrode between the second and third layers. The three layers of electro-optic material may comprise a set of subtractive primary colors, for example cyan, magenta and yellow pigments; it will readily be apparent that these colors may be distributed among the first, second and third layers in any order. (Alternatively, the displays of the present invention may use more than three primary colors, or use primary colors that are not the conventional subtractive primary colors.) The layer containing the yellow pigment may be arranged to have a smaller number of gray levels than the layers containing the cyan and magenta pigments. In one form of the invention, the electro-optic display has a viewing surface through which an observer views the display, and the two electro-optic layers closest to the viewing surface contain cyan and yellow pigments, in either order.

At least one layer of electro-optic material may comprise an electrophoretic material comprising a plurality of charged particles dispersed in a fluid and capable of moving through the fluid on application of an electrical field to the layer. Such an electrophoretic layer may be unencapsulated or may comprise a microcavity electrophoretic material. The charged particles in at least one of the layers (and preferably both the first and second layers) may be movable between a first optical state, in which the pigment particles occupy substantially the whole area of each pixel, and a second optical state, in which the pigment particles occupy only a minor proportion of the area of each pixel.

When the first and second electro-optic layers (and the third electro-optic layer if present) are both electrophoretic layers, independent control of the pigments in these layers may be facilitated by controlling a variety of physical parameters of the two layers. For example, the yield stresses of the fluids in the first and second layers may differ; the sizes of the microcavities in the first and second layers may differ; the particles in the first and second layers may differ in at least one of size, shape and electrical conductivity; or the fluids in the first and second layers may differ in at least one of viscosity and electrical conductivity.

A preferred form of electro-optic display of the present invention has a viewing surface at or adjacent the surface of the first electro-optic layer remote from the second electro-optic layer, and has a third electro-optic layer on the opposed side of the second electro-optic layer from the viewing surface, the third electro-optic layer comprising first and second types of particles of differing colors disposed in a fluid and capable of moving through the fluid on application of an electric field to the third electro-optic layer, the first and second types of particles being of differing electrophoretic mobility. The first type of particles in the third electro-optic layer may be white. The particles in the first and second electro-optic layers may be yellow and cyan, in either order, and the second type of particles in the third electro-optic layer may be magenta.

At least one of the first and second electrodes in the electro-optic display of the present invention may occupy only a minor proportion of the area of a pixel. In a microcavity display of the present invention, the walls of the microcavity may have a higher electrically conductivity than the phase comprising the plurality of charged pigment particles dispersed in the fluid. One of the electro-optic layers may have at least two stable states, while a second electro-optic layer may have only one stable state.

In another aspect, this invention provides an electro-optic display comprising first and second layers of cavities disposed adjacent one another with no electrode between the first and second layers, the sections of each of first and second layers of cavities lying adjacent the other layer being of substantially pyramidal form tapering towards the other layer, at least one of the first and second layers comprising colored particles dispersed in a fluid and capable of moving through the fluid on application of an electric field to the display. In such a display, the first and second layers may be formed of deformable capsules. One of the first and second layers may be free from colored particles.

In another aspect, this invention provides an electro-optic display comprising at least first, second and third layers of electro-optic material, the display further comprising a first electrode disposed on one side of the first, second and third layers, and a second electrode disposed on the opposed side of the first, second and third layers from the first electrode, there being no electrode between the first and second layers, or between the second and third layers, the first, second and third layers having the following properties:
(a) the first layer 1 has a voltage and/or impulse threshold, is state stable, and its color depends upon the polarity of the applied voltage;
(b) the second layer has either a lower threshold than the first layer, is state stable, and its color depends upon the polarity of the applied voltage; and
(c) the third layer has no threshold, is not state stable, switches faster than the second layer, and reaches the same state whether driven with a positive or a negative impulse and relaxes to its opposite extreme when no potential is applied.

Such a display may be driven by a method comprising:
(a) applying a high voltage to set the first layer to the desired color;
(b) applying a lower voltage than in step (a) to set the second layer to the desired color; and
(c) allowing the third layer to relax to its desired color.

In another aspect, this invention provides a microcavity electrophoretic display comprising walls defining at least one cavity, the cavity containing a fluid and first, second and third types of particles dispersed in the fluid, each of the first, second and third types of particles having an unshuttered state, in which the particles occupy substantially the entire area of the microcavity, and a shuttered state, in which the particles occupy only a minor proportion of the areas of the microcavity, the first, second and third particles being of differing colors and differing in dielectrophoretic and/or electro-osmotic properties such that the first, second and third types of particles can be moved between their unshuttered and shuttered states independently of one another. In such a display, the colors of the first, second and third types of particles are such that when all three types of particles are in their unshuttered states the display appears substantially black.

This aspect of the present invention is based upon the discovery of a range of colored organic pigments (i.e., having a color other than black) which provide image state stability without the need of a polymeric additive in the fluid of the electrophoretic medium. While the exact image state stability mechanism is not completely understood, it appears that these pigments themselves form loose aggregates when suspended in a fluid. This loose aggregate exhibits a yield stress: when the pigment dispersion is sufficiently concentrated, a gel is formed. With slight agitation, the gel is broken, resulting in a low viscosity fluid. Some of these pigments have refractive indices close to that of the preferred internal phase fluid and polymer phase surrounding the fluid, resulting in a low haze dispersion, even in the flocculated state. By appropriate blending of various colored pigments, a medium having a black optical state can be created.

Many such blends of organic pigments can also be made to display a substantial color gamut. By careful selection of the organic pigments used, the differently colored organic pigments present can be chosen to have substantial different dielectrophoretic mobilities, so that by manipulating the frequency and voltage applied to the electrophoretic medium, each pigment individually can be made to be in a dispersed state or in a packed state, i.e., the different organic pigments can be made to "shutter" independently of one another. Having a particular organic pigment in its dispersed state allows that pigment to absorb the corresponding color of transmitted light; the more uniform the dispersion, the greater the absorption. On the other hand, having a particular organic pigment in its packed state minimizes the fraction of the area of the electrophoretic medium where that pigment is located, thus minimizing the absorption by that pigment. It will readily be apparent by controlling the "shuttering" of differently colored particles independently of one another, a substantial color gamut can be displayed.

Such a multi-colored VT medium can be used directly as a full color display; if a reflective display is desired, a reflector can of course be placed behind the medium (i.e., on the opposed side of the medium from that viewed by the user). Alternatively, such a multi-colored VT medium can be used as a substitute for a conventional "static" color filter array, and used in combination with a monochrome reflective medium (either an inherently reflective medium or a transmissive medium provided with a reflector); this monochrome medium need not be an electrophoretic medium but could be any known type of electro-optic display. Such a dual layer display would have the advantage of allowing the multi-colored VT medium to control only the color of the various pixels or sub-pixels of the display, while the monochrome medium would control the brightly of each pixel or sub-pixel. Requiring the multi-colored VT medium to control only color lessens the demands upon independent control of the multiple pigments used in the VT medium, since no longer is the VT medium required to provide all colors at all levels of saturation.

The VT media of the present invention may be of any of the types of electrophoretic media discussed above. Thus, the VT media may be unencapsulated, encapsulated, microcell or polymer-dispersed media.

DETAILED DESCRIPTION

As already mentioned, in one aspect this invention provides an electro-optic display comprising at least first and second layers of electrophoretic material, each of which comprises a plurality of charged particles dispersed in a fluid and capable of moving through the fluid on application of an electrical field to the layer. The first layer of electrophoretic material is capable of displaying at least one optical state which cannot be displayed by the second layer. The display further comprises a first electrode disposed on one side of the first and second layers, and a second electrode disposed on the opposed side of the first and second layers from the first electrode; no electrode is present between the first and second layers. Typically, the electrophoretic display will further comprise a third layer of electrophoretic material comprising a plurality of charged particles dispersed in a fluid and capable of moving through the fluid on application of an electrical field to the layer. The third layer is capable of displaying at least one optical state which cannot be displayed by the first and second layers. The second electrode is disposed on the opposed side of the first, second and third layers from the first electrode, and no electrode between the second and third layers, the single pair (or set) of electrodes being used to control all three layers at least partially independently of one another.

Figure 12A:
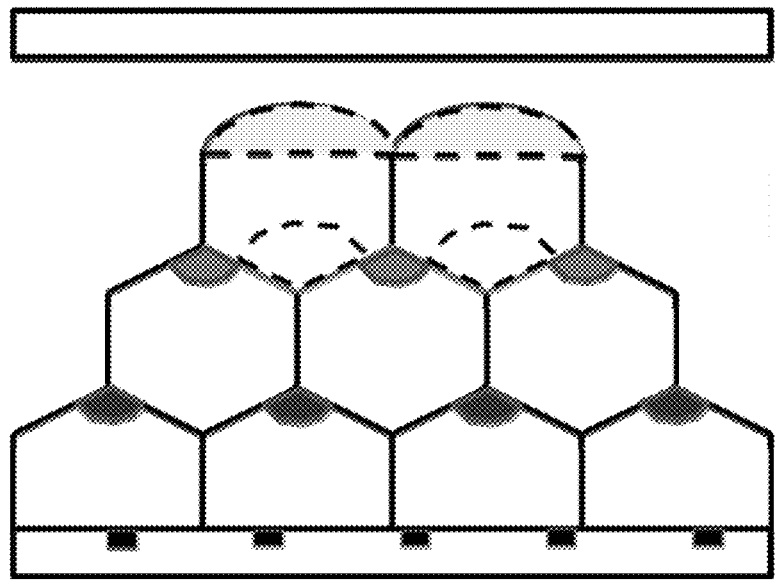
FIGS. 12A and 12B are schematic side elevations, similar to that of FIG. 11, showing two further three-layer displays of the present invention.

The basic concept behind the present invention is perhaps most easily appreciated by considering a three-layer display such as that shown in FIG. 12A of the accompanying drawings. The electro-optic layer closest to the viewing surface (the surface through which an observer views the display) has two different optical states, a "dispersed" or "unshuttered" state in which color is present over the whole area of a pixel, and a "concentrated" or "shuttered" optical state in which the color is absent from the major proportion of the area of the pixel and is present (if at all) only in a minor proportion of the area of the pixel. The second electro-optic layer (which lies behind the first electro-optic layer, as seen by the observer) operates in a manner similar to the first layer but uses a different color.

The third electro-optic layer (the one remote from the observer) of such a three-layer display may operate in the same manner as the first and second electro-optic layers using a third color; the first, second and third colors are normally chosen to form a set of subtractive primaries. If the third layer does act in this manner, a reflector will be positioned behind the display to reflect light which has passed through the three electro-optic layers back through those layers to the observer. More commonly, however, the third electro-optic layer is a chosen so that it can display either one of two colors, namely the third subtractive primary or white; the third electro-optic layer may be, for example, a conventional dual particle electrophoretic layer such as described in many of the aforementioned E Ink patents and applications.

The three electro-optic layers of the display are disposed between a single set of electrodes and an appropriate display controller is used to enable the three electro-optic layers to be driven at least partially independently of one another. In a preferred form of the display of the present invention in which the first and second electro-optic layers are shutter mode electrophoretic layers and the third electro-optic layer is a dual particle electrophoretic layer, the third layer can be driven using a direct current driving method, while the first and second layers are driven by different shuttering drive methods, as described in detail below.

Hereinafter for convenience, a material that selectively absorbs light is referred to as a "pigment", which term should be interpreted to include dyes, photonic crystals, etc., capable of selectively absorbing light. In embodiments of the invention intended to provide full color imaging using three subtractive primary pigments, light will typically be selectively filtered through at least two pigments before being reflected back to the viewer. The third pigment may be transparent or reflective, as described in more detail below. It is therefore necessary for at least two of the pigments used in the present invention to be light-transmissive and not substantially backscattering. Thus, for example, a magenta pigment is intended to absorb green light but must pass blue and red light to underlying layers. In regions where green light is not intended to be absorbed, it is necessary that the pigment not be present in the optical path. One way in which such removal of the pigment from the optical path may be achieved is to concentrate the pigment in only a (minor) portion of the pixel area, thus reducing its covering power. When magenta color is desired, the pigment is spread over the whole pixel area to enable the maximum amount of light to be absorbed. The process of spatially concentrating the pigment to reduce its areal covering power is referred to as "shuttering" the pigment.

Numerous methods can be used for shuttering pigments in response to an applied electric field, as described in detail below. As already mentioned, the displays of the present invention may make use of electro-optic layer formed from microcapsules, which may be coated in roll-to-roll processes. Alternatively, the electro-optic layers may use microcells, microcups or wells such as are known in the art. Although the invention will hereinafter primarily be described with regard to electro-optic layers using microcapsules, it is believed that those skilled in the technology of electro-optic displays will have no difficulty adapting the microcapsule based structures described to other methods for spatially segregating the pigment containing phases.

As already indicated, the present invention is directed to electro-optic displays in which multiple pigments are controlled by a single set of electrodes. Since the electric fields present between a single set of electrodes are substantially the same regardless of whether one or a plurality of electro-optic layers are present between those electrodes, it will be appreciated that the reaction of various pigments to the electric fields generated the single set of electrodes will in most cases be substantially the same regardless of whether the pigments are present between the electrodes in the same or different electro-optic layers. Accordingly, various embodiments of the present invention can be produced depending upon whether various pigments are present in the same or different electro-optic layers. Although the present invention will primarily be described with reference to embodiments of the invention in which each electro-optic layer (except one) contains only a single pigment, depending upon the exact driving methods used, all the pigments used may be contained in a single layer, or two pigments may be contained in one layer and a third in a different layer, and the means used to shutter the pigments may differ in different layers. A description is given below of one display of the present invention in which three pigments are present in a single layer of capsules.

Figure 1:
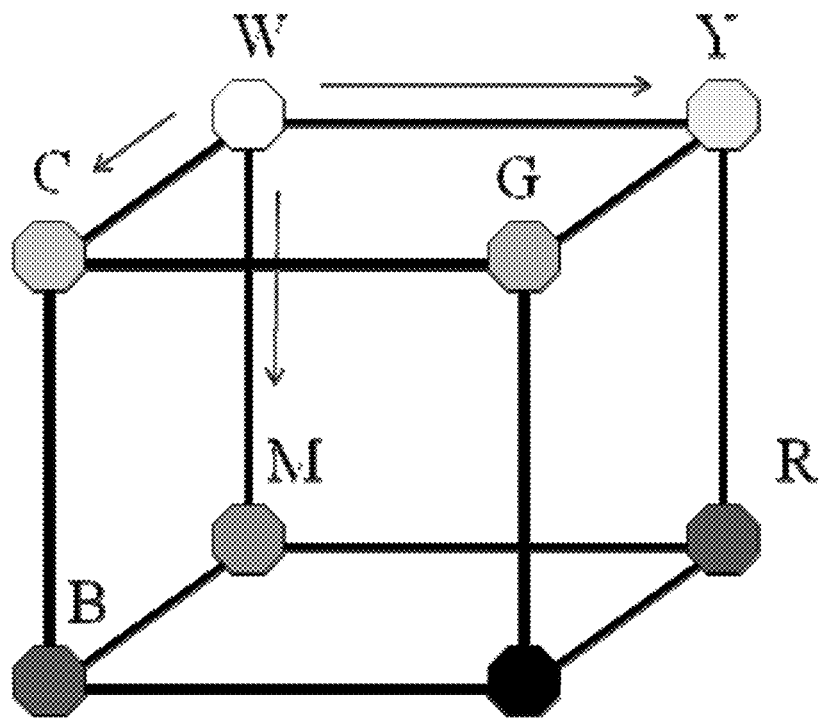
FIG. 1 of the accompanying drawings, as already mentioned, illustrates a simple color cube.
Figure 2A:
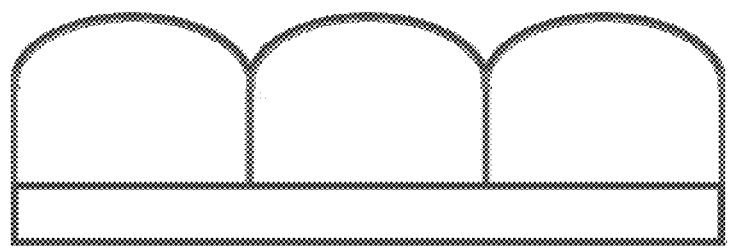
FIG. 2A is an idealized side elevation of a single layer of dried microcapsules formed on a flat surface.
Figure 2B:
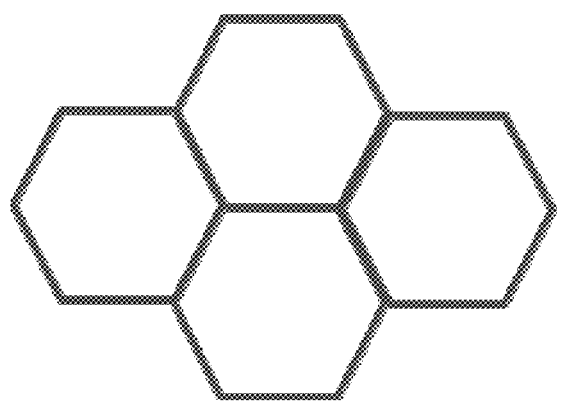
FIG. 2B is a top plan view of the layer of microcapsules shown in FIG. 2A.

Certain "geometric" methods for shuttering pigments rely, in some cases, upon the self-assembly of coated layers of microcapsules. Hence, a preliminary discussion of such coated layers is desirable. As discussed in many of the aforementioned E Ink patents and applications, and especially in U.S. Pat. Nos. 6,067,185; 6,392,785; 7,109,968; and 7,391,555, in practice prepared by forming an emulsion in which the discontinuous phase comprises droplets of an electrophoretic internal phase that comprises at least one pigment and a fluid (which is typically a low polarity, substantially water-immiscible hydrocarbon), normally with the addition of a charge control agent. The continuous phase of the emulsion comprises an aqueous solution of a polymer, typically gelatin. Polymeric material is deposited onto the surface of the droplets by, for example, formation of a coacervate of the gelatin and a second polymer, typically acacia, to form a thin capsule wall that may optionally be cross-linked, for example with an aldehyde. The resultant deformable microcapsules are spheres of approximately 20-100 µm in diameter. When such microcapsules are coated on a flat surface at a controlled coverage, they form essentially a monolayer of capsules. When this monolayer is dried, the capsules tend to contract vertically (i.e., perpendicular to the surface on which they are coated) and expand laterally to form oblate spheroids. Eventually, as the capsules expand laterally, their sidewalls come into contact with each other, and the capsules deform into polyhedral prisms whose shapes are similar to those formed by cells in foams. Ideally, a single layer of capsules will form a "honeycomb" (a two dimensional hexagonal lattice) of hexagonal prisms whose side walls, viewed in projection, meet at 120 degree angles, as shown (in idealized form) in FIG. 2A. (In practice, the microcapsules vary somewhat in size, and photomicrographs of dried single microcapsule layers typically show honeycombs similar to that illustrated in FIG. 2B, but with each microcapsule having from 4 to 8 neighbors. For reasons which will appear below, shuttering of pigments in the displays of the present invention is not greatly affected by such deviations from an ideal honeycomb of FIG. 2B.) Also, as shown in FIG. 2A, typically the faces of the capsules, that are in contact with the planar substrate onto which the capsules are coated, will conform to the flat surface, while the exposed face of each capsule will adopt a curved, "domed" shape.

Figure 2C:
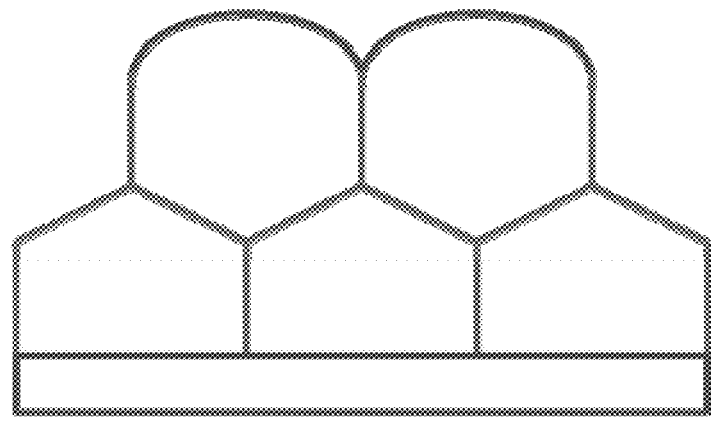
FIG. 2C is an idealized side elevation, similar to that of FIG. 2A, of a double layer of microcapsules formed on a flat surface.

When a second layer of microcapsules is coated on top of the first layer, surface tension forces leading to minimization of surface energy tend to cause deformation of the domed upper surfaces of the capsules in the first layer into a foam-like geometry as illustrated schematically in FIG. 2C. In this geometry, the upper portion of each capsule in the first layer has a substantially pyramidal shape in which the pyramidal portion are substantially flat and the intervening edges are substantially straight lines, four of which meet at each vertex at the tetrahedral angle of 109.5 degrees. For a detailed description of the geometry of foams, see for example "Foams: Theory, Measurements, and Applications", R. K. Prud'homme and S. A. Khan, eds., Marcel Dekker, Inc., 1996. Classically, the shape of each cell in a monodispersed foam is a semi-regular solid (essentially a truncated octahedron) with 14 faces. Note that the lower portions of each capsule in the second layer also has a substantially pyramidal shape, so that the pyramidal portions of the first and second layers fit together with the lowest vertex of each pyramidal section in the second layer filling into the recess between three pyramidal sections in the second layer. As explained below, the pyramidal sections of such double layers of capsules are important in one type of pigment shuttering. It will be appreciated that if a third layer of capsules is coated over the second layer, the interface between the second and third layers will display the same type of interpenetrating pyramidal sections as the interface between the first and second layers.

Figure 3A:
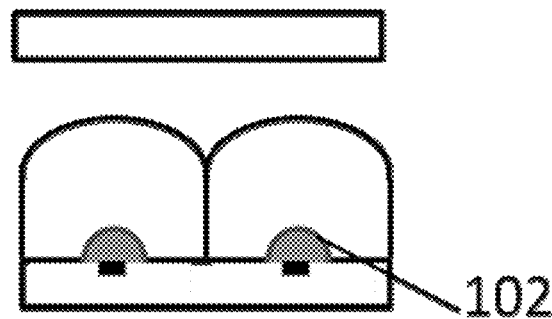
FIG. 3A is a schematic side elevation of two capsules in which pigment shuttering is effected using concentrator electrodes.

FIGS. 3A-3E illustrate various forms of pigment shuttering which may be employed in the displays of the present invention. FIG. 3A illustrates the shuttered optical state of a display which uses concentrator electrodes 102. Such concentrator electrodes are small electrodes which occupy only a small fraction of the area of each pixel so that when an appropriate voltage is applied to the concentrator electrodes, the pigment is attracted to the concentrator electrodes and thus only occupies a small fraction of the area of each pixel, i.e., the pigment is shuttered.

Concentrator electrodes may be patterned electrodes by which the display is addressed, for example grids of conductive material such as silver or gold that may be patterned onto a substrate by printing or lithographic methods, or continuous conductors that are masked with patterns of dielectric material. Concentrator electrodes may also be individually-addressable electrodes that are associated with an array of thin-film transistors. Alternatively, discrete, isolated conductive particles that are not directly electrically-addressed may be incorporated into a layer or layers within the display.

Figure 2D:
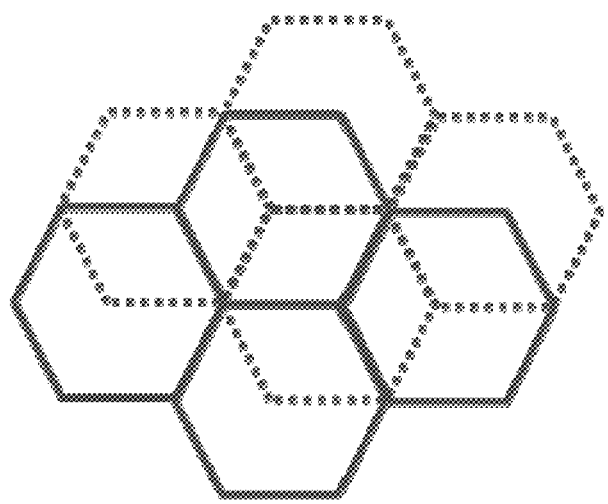
FIG. 2D is a top plan view of the double layer of microcapsules shown in FIG. 2C.
Figure 3B:
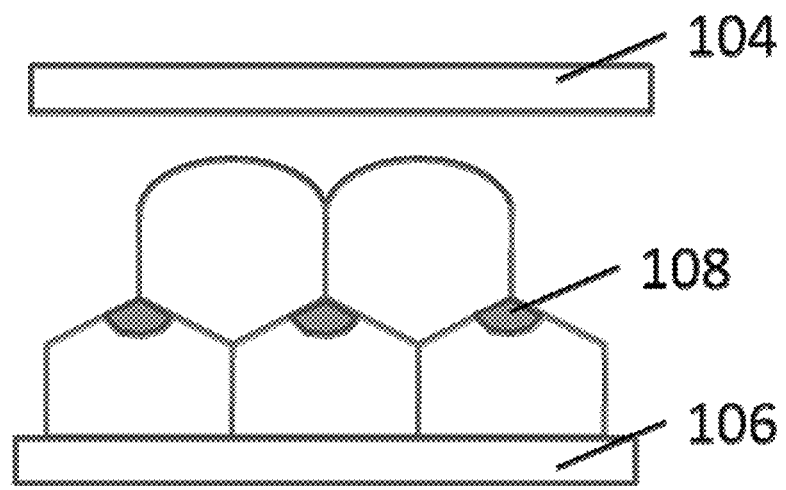
FIG. 3B is a schematic side elevation, similar to that of FIG. 3A, of two capsules which use side wall shuttering of pigment.

FIG. 3B illustrates geometric/capsule wall pigment shuttering in the first layer of a double capsule layer of the type illustrated in FIGS. 2C and 2D. Because of the pyramidal form of the upper section (as illustrated) of the first layer of capsules, when the potentials applied to electrodes 104 and 106 are arranged so that the pigment particles are attracted towards electrode 104, the pyramidal form of the upper sections of the capsules in the first layer will cause the pigment to form pigment packs 108 which occupy only the area around the uppermost vertex of each pyramidal section, and thus occupy only a small fraction of the area of each pixel, i.e., the pigment is shuttered.

Geometrical/capsule wall shuttering can be achieved naturally by the use of more than one layer of capsules whose wall materials are more electrically conductive than their internal phase. For example, a gelatin capsule wall typically has a conductivity on the order of $10^{-7}$ S/m (although this value is strongly dependent upon the degree of hydration of the polymeric material comprising the capsule wall). An electrophoretic internal phase typically has a conductivity much less that this, on the order of $10^{-8}$ S/m. Thus, the capsule wall of one layer of capsules can act as a concentrator "electrode" for a second layer of capsules. In addition, a geometrical shutter may be provided by the pyramidal shape that may be adopted by the capsule, as described above. If needed, geometrical shutters may be achieved by templated coating of capsules into, for example, V-shaped grooves as described in U.S. Pat. Nos. 6,130,774 and 6,172,798. Geometrical shutters may also be fabricated using photolithographic or embossing methods, or other methods that are well-known in the art.

Figure 3C:
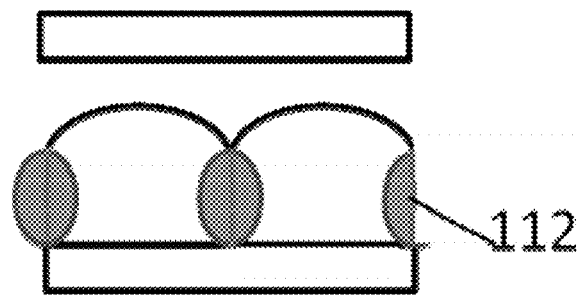
FIG. 3C is a schematic side elevation, similar to those of FIGS. 3A and 3B, showing how geometric pigment shuttering may be effected in a double layer of capsules similar to that shown in FIGS. 2C and 2D.
Figure 3D:
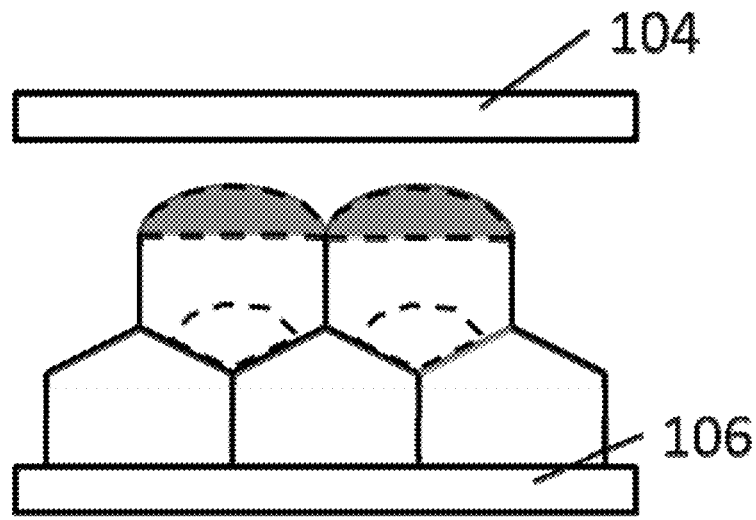
FIGS. 3D and 3E show respectively the non-shuttered and shuttered states of the second layer of capsules in a double layer of capsules similar to that shown in FIGS. 2C and 2D.
Figure 3E:
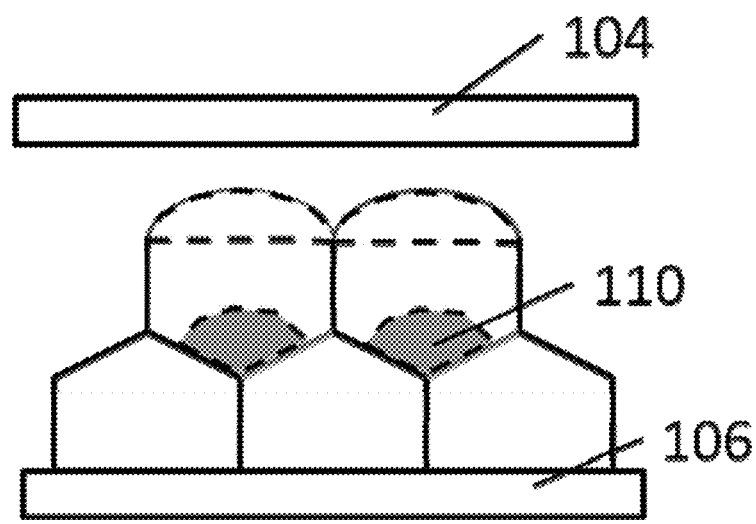

FIGS. 3D and 3E illustrate the use of geometric shuttering in the second layer of a double capsule layer of the type illustrated in FIGS. 2C and 2D. As shown in FIG. 3D, when the potentials applied to electrodes 104 and 106 are arranged so that the pigment particles are attracted towards electrode 104, because of the domed shaped of the upper portions of the second layer of capsules, the pigment spreads out over the whole area of the domed portion, and thus the entire pixel area, and is not shuttered. On the other hand, when the potentials applied to electrodes 104 and 106 are arranged so that the pigment particles are attracted towards electrode 106, the pyramidal form of the lower sections of the second layer of capsules causes the pigment to form small pigment packs 110 adjacent the lowermost vertex of each pyramidal section, and thus occupy only a small fraction of the area of each pixel, i.e., the pigment is shuttered.

FIG. 3C illustrates side wall shuttering. In this form of shuttering, in the shuttered state the pigment is moved laterally parallel to the plane of the electrodes so that it forms pigment 112 adjacent the side walls of the capsules.

Other methods for shuttering, such as use of anisotropic particles, for example, needles or plates that may be oriented with their principal axes either perpendicular or parallel to the plane of the display, or color-changing pigments, or swelling and deswelling of gels, or other similar methods that are known in the art, may also be used in the displays of the present invention.

As will readily been seen from the discussion of FIGS. 3A, 3B, 3D and 3E above, pigment shuttering using concentrator electrodes or geometrical/capsule wall shuttering may be achieved with direct current addressing of a display, in which the pigment motion is in the direction of the applied electric field. Side-wall shuttering may be achieved by addressing the display with alternating, in which case net pigment motion may be in a direction perpendicular to the applied electric field, as described in more detail below, such that pigment in the interior of the capsule is deposited in an equatorial "belt" around the capsule.

Figure 4:
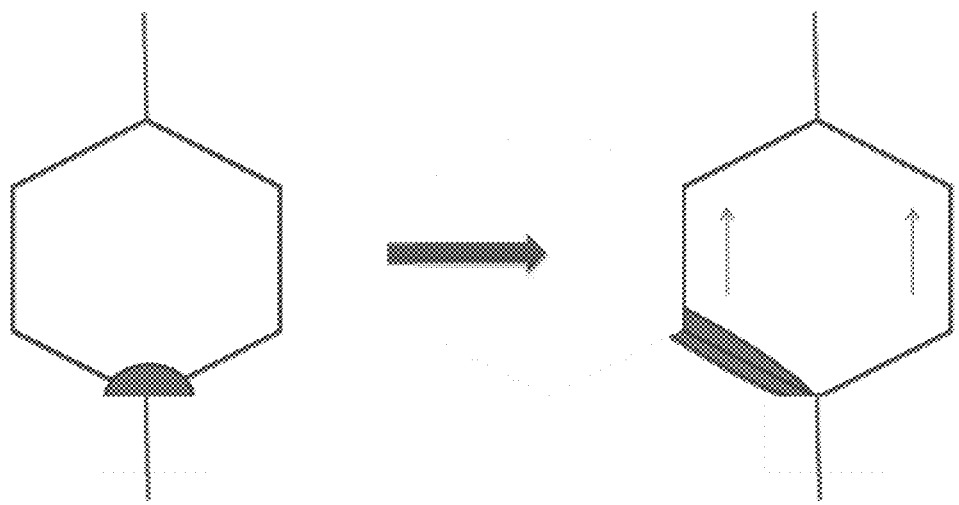
FIG. 4 is a schematic cross-section through a single capsule used in a display of the present invention and illustrates pigment dispersion effected by capsule wall charging.

The displays of the present invention obviously require some method for dispersing the pigment from its shuttered state to its unshuttered state, in which the pigment occupies substantially the entire area of a pixel. One method for such pigment dispersion that is especially preferred for use in conjunction with concentrator electrode or geometrical/capsule wall shuttering is illustrated schematically in FIG. 4, which illustrates the use of a combination of DC-addressing and a charged capsule wall being used to move a pigment perpendicular to an applied electric field. In the capsule shown in FIG. 4, the loading of pigment is very low (around 1% of the volume of the capsule) such that it may be concentrated into a very small region (shown as the lowermost vertex of the lower pyramidal section of the capsule in FIG. 4). Upon application of an electric field, the pigment would normally migrate from this vertex to the opposed vertex (i.e., vertically upwardly as illustrated in FIG. 4), where it would again be concentrated in a very small region adjacent the uppermost vertex of the upper pyramidal section of the capsule. By providing an attractive force between the pigment particles and the capsule wall, a perpendicular component (i.e., a component horizontally as illustrated in Figure) may be added to the electrical force applied to the particles, and so that the particles spread out laterally from the small region they occupy in their shuttered position. The necessary attractive force may be electrostatic. Thus, in some embodiments of the present invention, it is preferred that the pigment particles and the capsule wall bear charges of opposite polarity. (Obviously, this aspect of the invention cannot generally be applied to capsules which contain particles bearing charge of both polarities, and is best suited to capsules containing only one type of particle or "same polarity dual particle capsules, as described for example in U.S. Pat. No. 6,870,661) For example, if gelatin/acacia is used to form the capsule wall, and a charging agent such as Solsperse 17000 (available from Lubrizol) is used, the capsule wall may attain a negative charge and a pigment that attains a positive charge with the same charging agent is preferred. Other methods that may provide attraction between the pigment particles and the capsule wall include the use of flocculating agents, especially depletion flocculants. The result of using such capsule-wall attraction is that the pigment will be essentially invisible at either extreme of a DC pulse, but visible during the transition from one concentrated state (at the top of the capsule) to another concentrated state (at the bottom of the capsule) or vice versa. The pigment may be trapped in what would be a transient state in simple DC driving by driving with AC having a frequency of between about 30 and 50 Hz, and applying a DC offset to the AC drive.

The present invention is not confined to use of a mobile charged pigment with a capsule wall bearing a charge of the opposite polarity but extends to the use of such a pigment with any fixed surface bearing a charge of the opposite polarity. The fixed surface acts to constrain the motion of the pigment in an applied field. The medium containing the pigment and the surface need not be encapsulated.

The shuttering mechanisms described above may be combined with conventional switching of pigments using DC addressing to give rise to particle motion within a capsule parallel to the applied field as already mentioned with regard to FIGS. 3D and 3E. In this case is may be desirable that geometrical/capsule wall shuttering not occur, and this can be ensured by incorporating more pigment into the capsule than can be concentrated in a groove or crevice. Such conventional electrophoretic switching may involve a single pigment moving through a dyed liquid, dual pigments of the same or opposite charge, or combinations of multiple pigments and dyed fluids, as described in the aforementioned E Ink patents and applications.

Figure 5A:
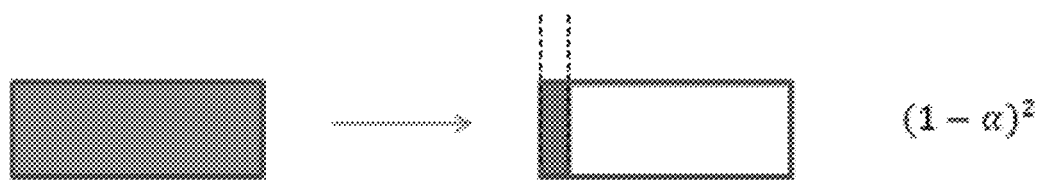
FIGS. 5A, 5B and 5C illustrate, in idealized form, three different ways in which shuttered pigment particles may be packed in a microcavity, and the corresponding transmission efficiency for a double pass of light through the microcavity.
Figure 5B:
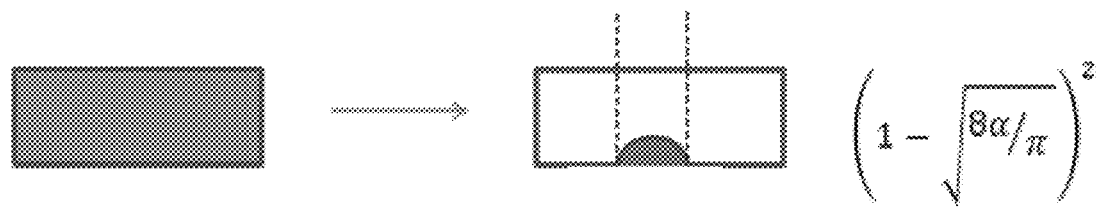
Figure 5C:
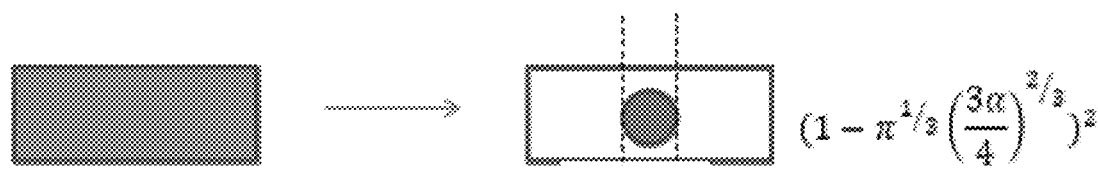

Shuttering methods of all types tend to impose limitations on the volume fraction of pigments particles which can be present in an electrophoretic medium. It is desirable that at least about 85 percent of light be transmitted through a layer of shuttered pigment in a single pass, i.e., the pigment should not absorb more than about 15 percent of the light; this corresponds to a reflection efficiency of about 70 percent for a double pass through the shuttered layer such as will normally occur in the displays of the present invention. FIGS. 5A, 5B and 5C show, in simplified form, three different possible forms of packing of pigment particles using some idealized shuttering methods. In the following simplified analysis, light losses due to (inter alia) total internal reflection, scattering except by a Lambertian reflector behind the cavity, and interfacial reflections are ignored. FIG. 5A pigment is deposited onto the side-walls of a cavity whose walls are perpendicular to the plane of the display. Assuming that the pigment absorbs all incident light and that light passes once through the cavity, is reflected in a Lambertian fashion, and then passes a second time through the cavity, the proportion of light absorbed is $(1-\alpha)^2$ where $\alpha$ is the volume fraction of the pigment within the cavity. In FIG. 5B, the pigment is collected in a half-cylinder on one face of the cavity parallel to the viewing surface of the display (which is assumed to be horizontal in FIGS. 5A-5C). The form of pigment collection will typically be appropriate for collection at a concentrator electrode in the absence of any geometrical shuttering. FIG. 5C shows concentration of pigment into a spherical shape.

Figure 6:
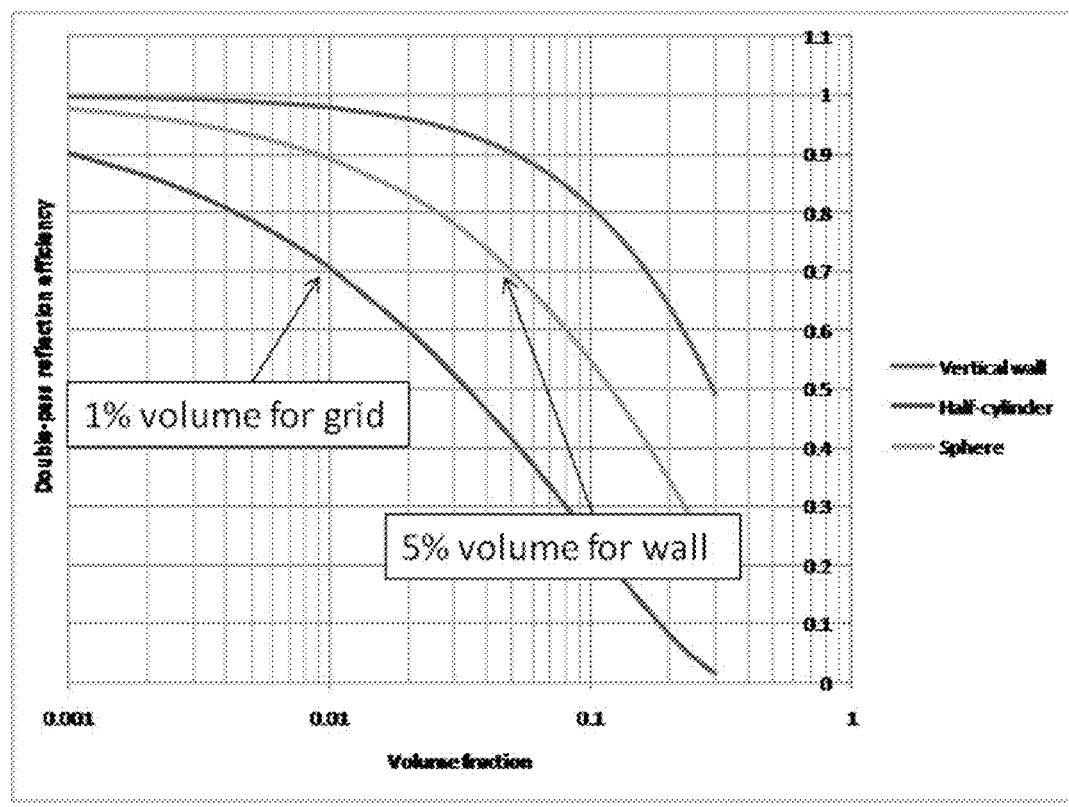
FIG. 6 is a graph showing the transmission efficiencies of the three pigment arrangements of FIGS. 5A, 5B and 5C as a function of the volume fraction of pigment in the cavity.

FIG. 6 is a graph showing the estimated double pass transmission efficiency for each shuttering geometry shown in FIGS. 5A, 5B and 5C as a function of the volume fraction of the pigment within the cavity. Assuming that a double pass efficiency of 70 percent is acceptable, FIG. 6 shows that this requires not more than about 1 percent by volume of pigment for a hemicylindrical pigment geometry (FIG. 5B), and not more than about 5 percent by volume for a spherical pigment geometry (FIG. 5C). In view of these low acceptable pigments concentrations ("loadings") it is preferred that pigments used for shuttering have the maximum possible extinction coefficient so that they can be used in the least possible loading.

Such volume fraction limitations for shuttered pigments also imposes constraints on the preferred particle size of such pigments. Particles that are randomly arranged on a surface cover that surface less efficiently than an ordered, close-packed monolayer, such that approximately two monolayer-equivalents of particles are required for an area coverage of 90 percent. In addition, for a typical dye having an extinction coefficient of 50,000 L/mole/cm, a specific gravity of 1.5 and a molecular weight of 500, a perfectly-packed layer of 70 nm thickness is required for an optical density of 1 (i.e., 90 percent absorption of light). It is therefore preferred that for such a dye, the diameter of the pigment particle be on the order of half this thickness or less. In practice, pigment particle sizes of less than about 100 nm diameter are preferred for concentrator electrode and geometrical/capsule wall shuttering. Larger particles may be hidden using side-wall shuttering since this method permits a larger loading of pigment for the same degree of shuttering, as described above.

Additional optical losses may occur if the positions at which the pigments are shuttered in separate layers do not overlie one another (i.e., are not registered, as would be the case when the pigments are located in different layers in a display having multiple layers of capsules). If the absorption spectra of the pigments overlap, some light of a wavelength absorbed by both pigments may be absorbed in one area of a pixel by a first shuttered pigment in a first layer and in another area of the same pixel by a second shuttered pigment in a second layer. This problem can be avoided by removing spectral overlap in the shuttering pigments so that there is no wavelength absorbed by two pigments. Thus, in a display when two pigments are shuttered and a third is switched by conventional electrophoresis, it is preferred that the two shuttered pigments be yellow and cyan (whose absorption spectra are both designed to pass green light, and which therefore do not significantly overlap).

As mentioned above, AC addressing may be used to shutter pigments. A rich variety of phenomena occur when AC addressing is employed, including induced-charge electro-osmosis and electrophoresis and induced-dipole effects such as dielectrophoresis and particle chaining. Which behavior occurs is affected by the field strength and frequency applied and by properties of the components in the capsule internal phase, as will now be described in more detail.

Figure 7A:
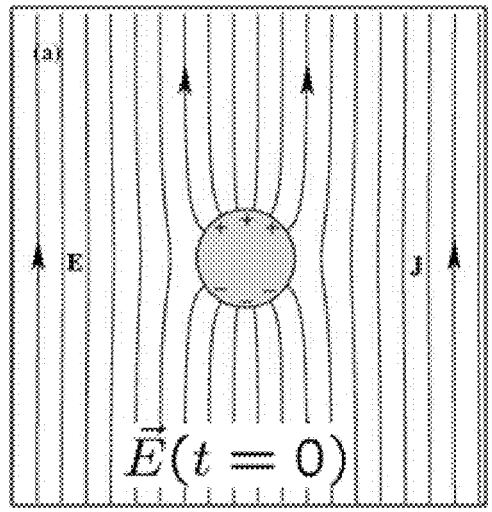
FIGS. 7A, 7B and 7C, which are reproduced from Todd Squires and Martin Bazant, *J. Fluid Mech.*, (2004) 509, 217-252, show in cross-section a spherical pigment particle surrounded by a solvent that contains a charge control agent, and illustrates the forces acting on the pigment particle in various types of applied electric fields.

FIG. 7A shows a schematic cross-section through a spherical pigment particle surrounded by a solvent that contains a charge control agent (CCA). The CCA is typically a surfactant-like molecule comprising ionic groupings, hereinafter referred to as "head groups". At least one of the positive or negative ionic head groups is preferably attached to a non-polar chain (typically a hydrocarbon chain) that is hereinafter referred to as a "tail group". It is thought that the CCA forms reverse micelles in the internal phase and that a small population of charged reverse micelles leads to electrical conductivity in the internal phase. The CCA also is thought to adsorb onto the surfaces of the pigment particles and onto the interior walls of the capsules. Collectively the CCA and the reverse micelles mediate charging of all surfaces (on the particle and the capsule wall) in the internal phase of the electrophoretic medium.

It is thought that a particle with immobilized charge on its surface sets up an electrical double layer of opposite charge in the surrounding fluid. Ionic head groups of the CCA may be ion-paired with charged groups on the particle surface, forming a Stern layer of immobilized charged species. Outside this layer is a diffuse layer comprising charged micellar aggregates of CCA. In conventional DC electrophoresis an applied electric field exerts a force on the fixed surface charges and an opposite force on the mobile counter-charges, such that slippage occurs within the diffuse layer and the particle moves relative to the fluid. The electric potential at the slip plane is known as the zeta potential.

Figure 7B:
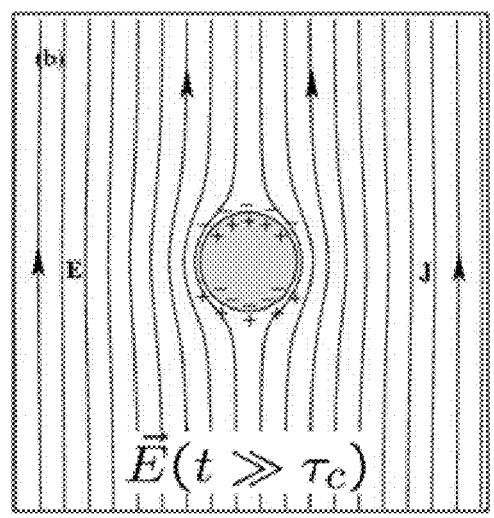
Figure 7C:
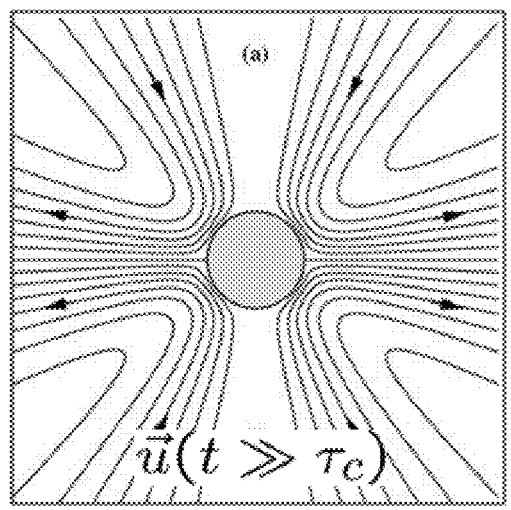

Induced-charge electro-osmosis (hereinafter abbreviated "ICEO", but known as "AC electro-osmosis") is a similar phenomenon but occurs in response to induced charge rather than fixed surface charges. It is described in V. A. Murtsovkin, Colloid J., 58, 341-349 (1996) and in a series of papers by H. Morgan and co-workers (see, for example, J. Colloid Interface Sci., 217, 420-422 (1999) and Phys. Rev. E, 61, 4011-4018 (2000)), and has more recently been reviewed in detail by Squires and Bazant (J. Fluid Mech., 509, 217-252 (2004). In ICEO, an externally applied electrical field induces a polarization in the vicinity of a surface and simultaneously drives the resulting electro-osmotic flow. This creates a flow velocity that is nonlinear in the applied field strength. In the presence of an applied electric field an induced dipole may be set up (see FIG. 7A), the magnitude of which depends upon particle bulk and surface properties including conductivity, dielectric constant, size and shape. This induced dipole in turn causes a flow of ionic species (probably micelles) in the fluid that sets up a corresponding double layer of opposite charge (FIG. 7B). An electro-osmotic flow is then driven (FIG. 7C) such that the fluid is drawn in from the poles and expelled at the equator. The direction of the fluid flow is the same irrespective of the polarity of the applied electric field, and the flow can thus be driven by an applied AC potential. In the case of a spherical particle in a uniform field, no particle motion would result (since the flows are symmetrical). In practice, however, pigment particles are not perfectly spherically symmetrical and jets of the mobile phase may be set up that induce chaotic motion of the particles.

Bazant has estimated the charging time for establishment of the double layer (FIG. 7B) as:

$$\tau_c = \frac{\lambda_D a}{D} \quad (1)$$

for a conductive cylinder in an electric field, where $\lambda_D$ is the Debye length, a is the particle radius, and D the diffusion constant of the charge carrier in the mobile phase. Although pigment particles are typically composed of dielectric materials, electrical conduction within the Stem layer may occur through a number of known mechanisms, including proton hopping (particularly in the presence of adsorbed water) and therefore the assumption of conductivity is not unreasonable in the present context. The following discussion is included in order to provide a qualitative, heuristic picture of some of the mechanisms that may occur in the present displays and does not in any way limit the scope of the invention.

Equation (1) above shows that the charging time gets longer as the particle gets larger. The maximum induced-charge electro-osmotic velocity is then estimated as:

$$U_{max} = \frac{\varepsilon E^2 a}{\eta(1 + \omega^2 \tau_C^2)} \quad (2)$$

where E is the magnitude of the applied field, $\omega$ the angular frequency and $\eta$ the viscosity of the mobile phase. It can be seen that as the frequency increases the maximum induced-charge electro-osmotic velocity decreases. At high frequencies, where $\omega^2 \tau_c^2 \gg 1$, the induced-charge electro-osmotic velocity becomes very low (because there is no time to charge up the double layer) and screening of the induced dipole by the charge carriers in the fluid is reduced. At such frequencies particle-particle interactions leading to chaining, or interactions with field gradients leading to dielectrophoretic mobility, may occur. Thus, applying an AC field with increasing frequency may at low frequencies cause electro-osmotic flow, as described above, but as the frequency is increased particle-particle interactions and dielectrophoresis may dominate. The result may be, for example, that all the particles concentrate by induced-dipole aggregation. They are most likely to concentrate in regions where, at the electro-osmotic driving frequency, stationary points of the flow may be located (i.e., in a ring around the equator in the case of particles within a spherical capsule). The frequency at which particle concentration occurs (in the idealized case) is proportional to the applied field and also depends inversely upon the particle size, since:

$$U_{max} = \frac{\varepsilon E^2 D}{\eta a \omega^2 \lambda_D^2} \quad (3)$$

The present inventors have observed that when a display is addressed at relatively low AC frequencies (typically in the range of 30-100 Hz) encapsulated pigment particles exhibit high-speed motion and become uniformly distributed in a capsule. At higher frequencies the pigment particles' motion slows down and they may collect at the capsule walls, leading to transparency (shuttering). If the frequency is suddenly increased from a relatively low to a relatively high value, however, there may not be time for the particles to reach the stationary points of flow at the wall, and they will become immobilized but not shuttered. Thus, for optimal shuttering it is preferred that either the frequency be ramped from a low to a high value at constant voltage, or that the voltage be ramped from a high to a low value at constant frequency, or some combination of these two ramps.

The frequency at which the transition from ICEO motion to a stationary state occurs is related to (and in some cases proportional to) the applied voltage and depends upon particle properties such as size, shape and conductivity and to fluid properties such as viscosity, conductivity and dielectric constant. Thus, pigments may be selectively and independently addressed by varying the frequency of AC used to drive a display. For example, a first pigment in a first capsule may have a large size and be incorporated into a fluid of high viscosity, whereas a second pigment in a second capsule layer may have a small size and be incorporated into a fluid of low viscosity. At a lowest addressing frequency $\omega_1$, both pigments will be distributed and spread out by electro-osmotic motion. At a higher addressing frequency $\omega_2$ the first pigment may be shuttered while the second pigment is still in motion. At a yet higher frequency $\omega_3$ both pigments may be shuttered. If the frequency is suddenly switched from $\omega_1$ to $\omega_3$ (or to a frequency slightly lower than $\omega_3$ and then increased to $\omega_3$) there may not be time for the first pigment to shutter but there may be time for the second pigment to do so. Thus, using a constant voltage and varying only the frequency of addressing, it is possible to access different colors while driving each color with the same waveform. It will be clear that the same effect may be obtained by holding the frequency constant and varying the voltage, and that such a scheme may be extended to more than two colors. Examples 1-3 below describe addressing more than one color in a single capsule layer using alternating voltages of different frequencies. (It will of course be apparent that, when the frequency at which the transition from ICEO motion to a stationary state occurs for different particles is controlled by particle properties alone it is possible to incorporate particles of more than one color into a common capsule rather than providing a separate environment for each pigment, as described above.)

Figure 8A:
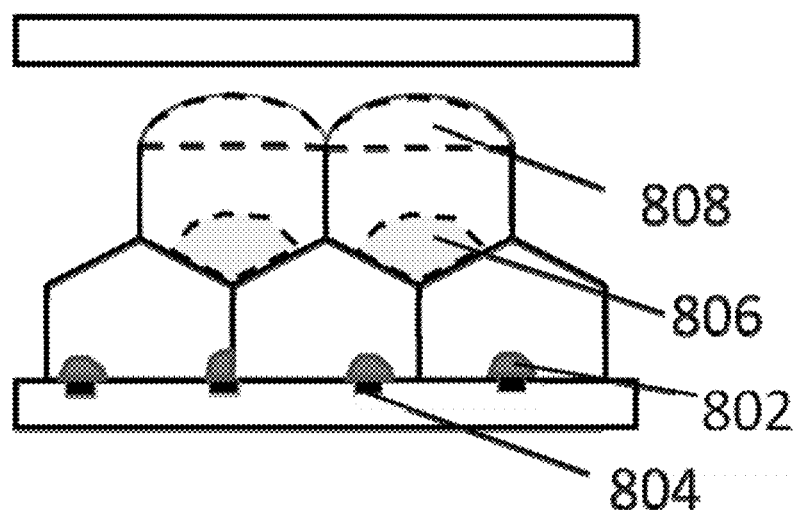
FIGS. 8A-8D illustrate various states of a two electro-optic layer display of the present invention, and show the manner in which two layers can be made to shutter independently using a common waveform.
Figure 8B:
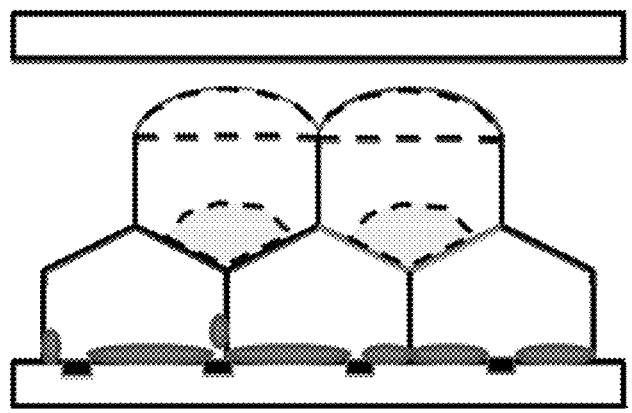
Figure 8C:
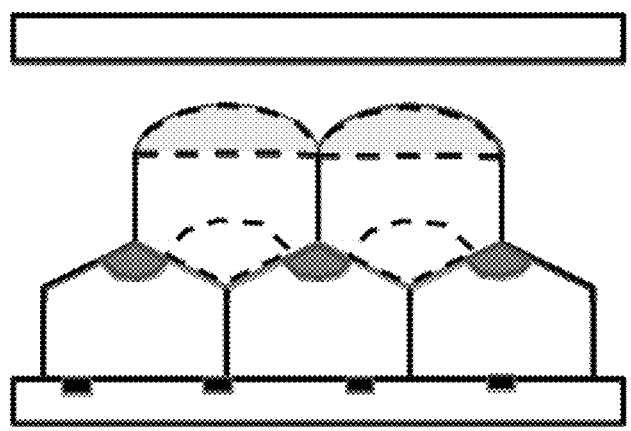
Figure 8D:
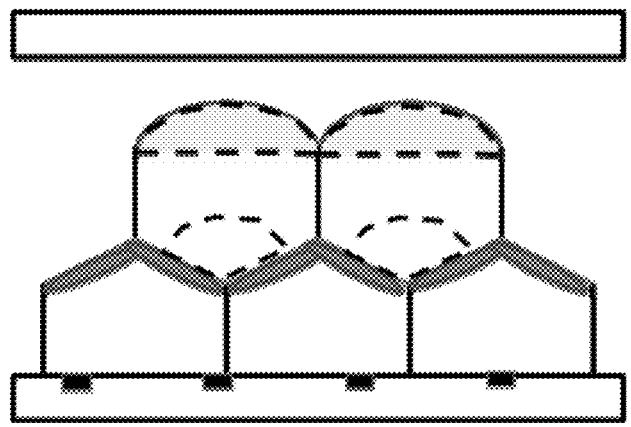

Another method for using shuttering a plurality of pigments while driving all pigments with a common waveform is illustrated in FIGS. 8A-8D, which show in schematic cross-section a two layer display of the present invention having a first layer of microcapsules containing a first pigment coated onto a substrate bearing a concentrator electrode such as a grid electrode, over which is coated a second layer of capsules containing two oppositely-charged pigments, one of which is (the second pigment) is colored and the other of which is white. (It should be noted that the display shown in FIGS. 8A-8D is intended to be viewed from below as illustrated.) Addressing of the two colors (to the four possible extreme states of color 1, color 2, color 1 plus color 2, and no color) is achieved by taking advantage of differences between the timing of shuttering in the first layer and the timing of vertical switching in the second layer. FIGS. 8A-8D illustrate four different states of the display. In FIG. 8A, the first pigment 802 is shuttered to the concentrator electrodes 804 and the second pigment 806 is visible in front of the white pigment 808. In FIG. 8B, the pigment 802 is spread uniformly across the first layer, while the second layer is in the same state as in FIG. 8A, so that the display shows the first and second pigments 802 and 806 together against a white background. In FIG. 8C, the second pigment 806 is hidden behind the white pigment 808 and the first pigment is shuttered by being concentrated at the uppermost vertices of the upper pyramidal sections of the first layer of capsules, so that the display shows the white pigment. In FIG. 8D, the first pigment 802 is spread uniformly over the upper surfaces of the first layer of capsules, while the second layer is in the same state as in FIG. 8C, so that the display shows the first pigment against on a white background. A display of this kind is described in detail in Example 4, below.

The necessary independent control of the two capsule layers in FIGS. 8A-8D may be achieved by exploiting differences in the rate of switching between the two types of capsule. Such differences in rate can be non-linear with applied voltage if, for example, the fluid within a capsule exhibits a yield stress, such that with an applied voltage below a threshold value no pigment motion occurs within the capsule. Thus, for example, if the first layer of capsules shown in FIGS. 8A-8D above have a voltage threshold for switching of V1 and the second layer of capsules have a voltage threshold of V2, where V2>V1, the second layer could be addressed at a voltage greater than V2 (which will also switch the first layer) after which the first layer could be switched at a voltage V1 between V1 and V2 (without affecting the second layer). Such a scheme can be extended to three layers of capsules having three voltage thresholds.

The necessary voltage thresholds may be provided in a variety of ways. As mentioned above, the internal phase of a microcapsule may have a yield stress. Particles of opposite charge to the shuttering pigment may be added to the capsule to create a Coulombic threshold. These particles of opposite charge may be substantially non-scattering and non-absorbing, such that they do not affect the absorption of light by the colored pigment and do not affect the overall appearance of the display, being incorporated simply to modulate the switching behavior of the interior of the capsule.

Figure 9A:
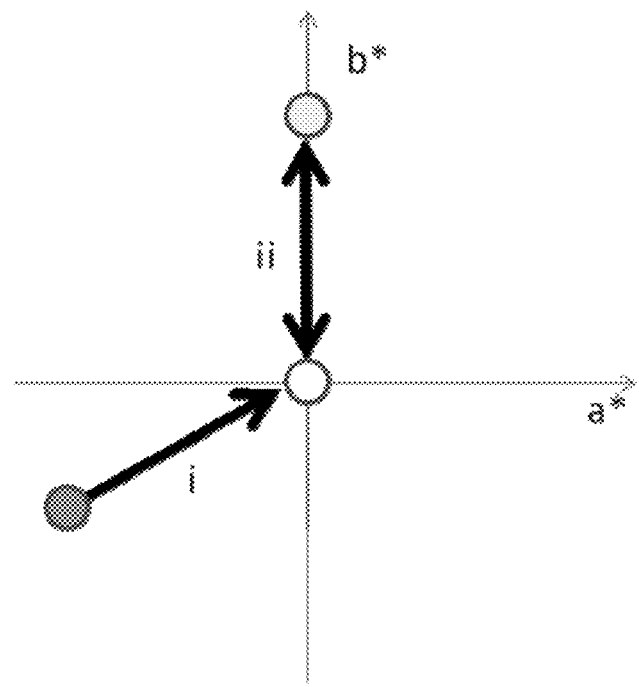
FIGS. 9A and 9B are projections on the a*b* plane of the La*b* color space and illustrate the color changes occurring during the operation of one display of the present invention in which two layers switch at the same rate.
Figure 9B:
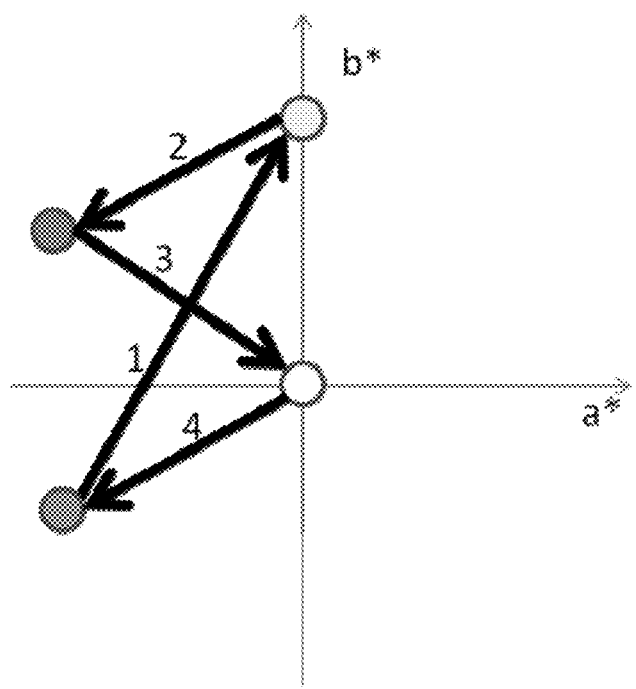

Another technique to address capsule layers independently is to make one layer of capsules multi-stable (i.e., to endow this layer with image hysteresis, as may be achieved by providing a polymer dispersed in the fluid—see U.S. Pat. No. 7,170,670, and to make a second layer that does not exhibit hysteresis and reverts to a default state when not actively addressed. FIGS. 9A and 9B illustrate the color changes of such a display in terms of their projection on the a*/b* plane of the La*b* color space. Arrow i in FIG. 9A represents switching from cyan to white, such as could occur in the first layer of capsules in FIGS. 8A-8D. When a field of either polarity is applied, the pigment shutters from a dispersed state, and, if it is assumed that the image so formed is not stable, when the field is removed the shuttered pigment redisperses and the default cyan state is re-formed. Arrow (ii) shows the switching of white to yellow, such as could occur in the second layer of capsules shown in FIGS. 8A-8D. This switching is hysteretic, such that the final state is stable until the field direction is reversed.

FIG. 9B illustrates how four colored states can be achieved in this display when the switching speeds of capsules in the first and second layers are the same. Arrow (1) shows the display being driven by application of an electric field such that the first layer of capsules is driven to white (from the default cyan state) and the second layer is driven from white to yellow. Arrow (2) shows that as the driving field is reduced to zero the second layer remains in the yellow state but the first layer defaults to cyan, resulting in the combination of yellow and cyan, which is green. Arrow (3) shows that as the display is then driven with an electric field of the opposite polarity the first layer is again driven to white, while the second layer is driven from yellow to white. The result is a white image. Finally, arrow (4) shows that as the field is reduced to zero from the reversed polarity drive, the second layer remains white while the first layer reverts to cyan, resulting in a cyan image. Different levels of the colors may be attained by changing the time of driving at a particular voltage (pulse-width modulation) or by changing the drive voltage.

Figure 10A:
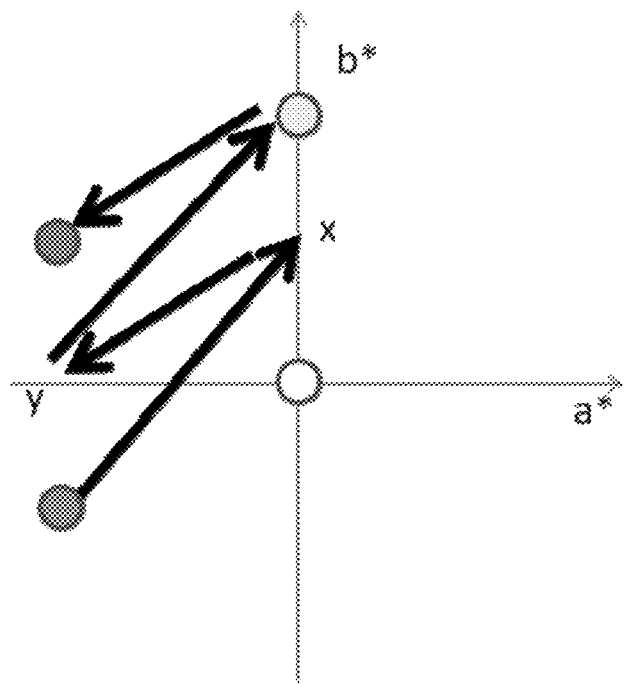
FIGS. 10A and 10B are projections similar to those of FIGS. 9A and 9B respectively but illustrate the color changes occurring in a display in which the two layers switch at different rates.
Figure 10B:
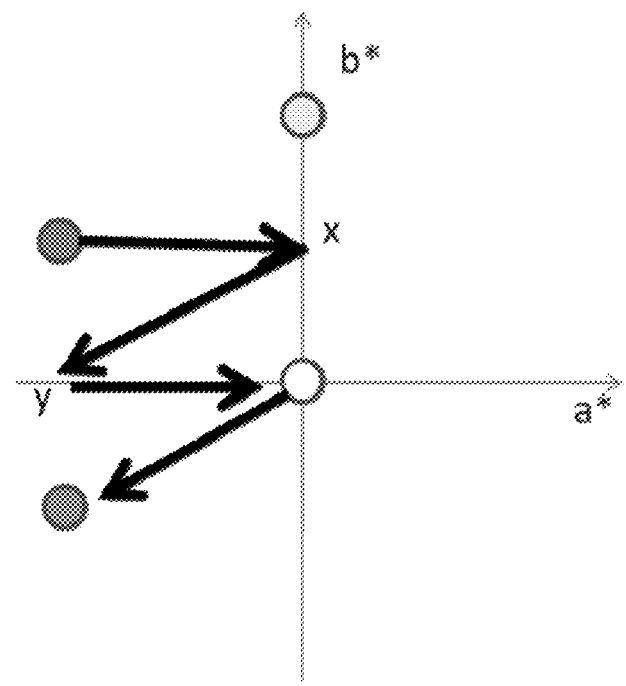

A larger color gamut may be achieved if the rates of switching of the two layers are not the same. FIGS. 10A and 10B are projections similar to FIGS. 9A and 9B respectively but show the color changes occurring when the cyan shuttering layer is faster than the white/yellow layer but not so fast that cyan can be completely shuttered without any switching of the yellow layer. It is assumed that the white/yellow layer exhibits hysteretic image stability whereas the cyan shutter does not (although similar principles apply if both layers exhibit hysteretic image stability). In FIG. 10A there is seen the path that is followed as the white layer is switched to yellow. At short times of switching the cyan layer is completely shuttered whereas the white layer has not completely switched to yellow. This provides a mid-yellow state shown as x in FIG. 10A. Relaxation of the cyan shutter provides a blue-green color shown as y. Continued switching of the yellow provides a completely yellow state, from which green is obtained by relaxation of the cyan shutter. As is shown in FIG. 10B, the path followed when switching from yellow to white is not the same, although it visits the same points at the extremes (i.e., open and closed) of the cyan shutter. It is noteworthy that the pure yellow and white states are only attained with one direction of driving. If the cyan shutter does not exhibit hysteretic image stability, a holding voltage is required to maintain a state which is not the default.

Figure 11:
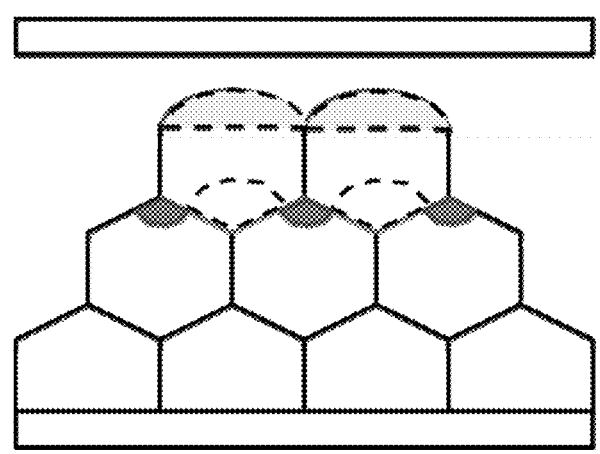
FIG. 11 is a schematic side elevation, similar to those of FIGS. 8A-8D but showing a three-layer display of the present invention in which one layer contains no pigment particles.

FIG. 11 shows a schematic side elevation of a three-layer display of the present invention. This three-layer display is generally similar to the two-layer display shown in FIGS. 8A-8D, except that the concentrator electrodes are replaced by a first layer of capsules whose walls are more conductive than their interior. This layer of capsules may contain no pigment and be transparent, serving simply to act as a template and shape the second layer of capsules (containing the first pigment) and provide a capsule wall shutter. The mechanism by which the display of FIG. 11 achieves the four possible extreme states of two primary colors is exactly analogous to that described above with reference to FIGS. 8A-8D. A three-layer display of this kind is described in detail in Example 5 below.

A third primary color may be provided in the displays shown in FIGS. 8A-8D and 11 in several different ways. FIG. 12A illustrates provision of a third primary color that is shuttered using any of the three methods mentioned above (a concentrator electrode is shown, but capsule wall/geometrical shuttering or side-wall shuttering may be used also).

Figure 12B:
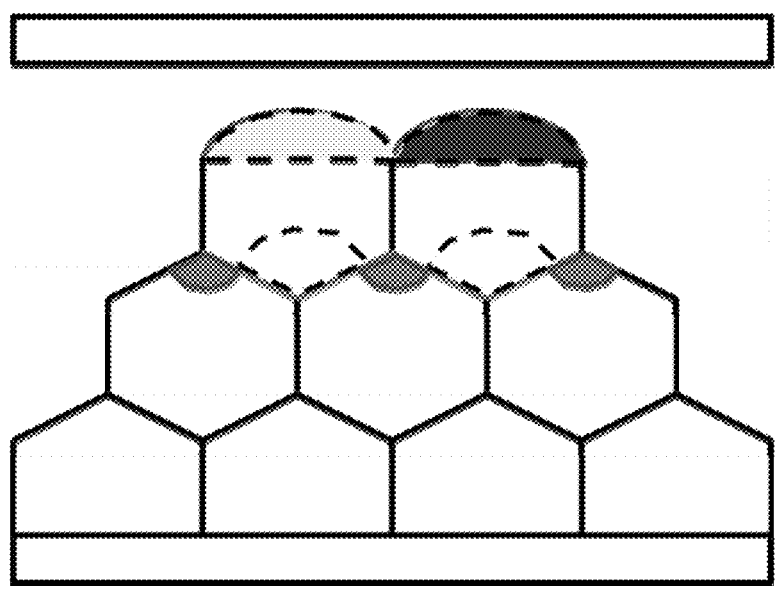

FIG. 12B illustrates provision of a third color in the same layer as the second color, i.e., in combination with a white pigment, and switched vertically. Again, the third color should be switched considerably more slowly than either the first or the second colors. In the display of FIG. 12B, the second and third colors are arranged side-by-side, which is a less favorable configuration that shown in FIG. 12A. It is possible, however, for the capsules containing the third color to be of a different size from those containing the second color, and that therefore some overlap of the capsules may be achieved. In addition, some mixing of the second and third colors may be achieved by light scattering within the structure. FIG. 12B shows a capsule wall/geometrical shutter for the first pigment, but a layer of capsules may be eliminated and concentrator electrodes used instead to shutter the first pigment.

Figure 12C:
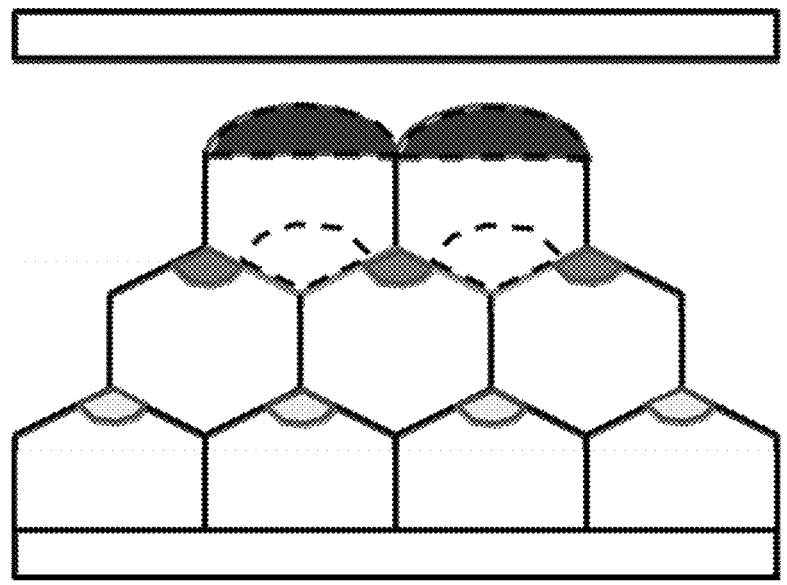
FIGS. 12C and 12D show two different states of a further three-layer display of the present invention.
Figure 12D:
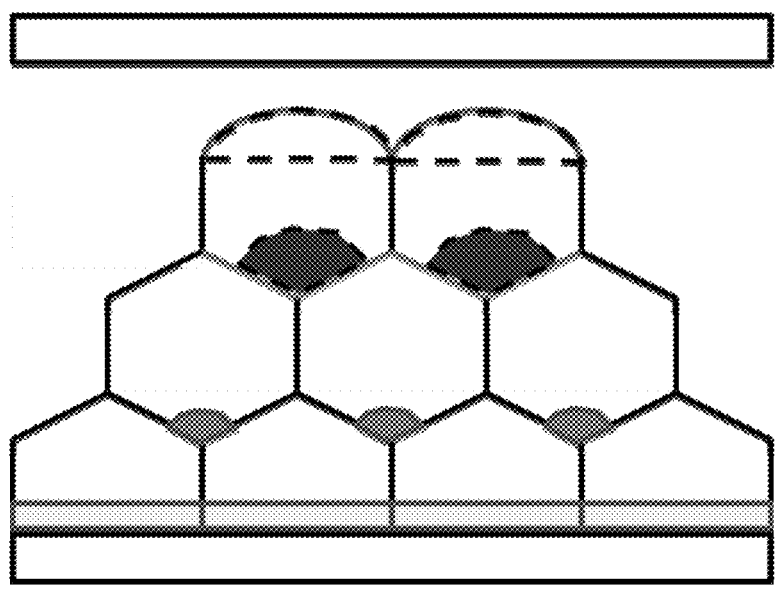

FIGS. 12C and 12D show two different optical states of a three-layer display of the present invention generally similar to the displays shown in FIGS. 12A and 12B. In the display shown in FIGS. 12C and 12D, the first electro-optic layer (the lowest layer as illustrated in FIGS. 12C and 12D) contains a yellow pigment, is state-stable, has a threshold and requires a high operating voltage. The yellow pigment in this layer is movable between the shuttered state shown in FIG. 12C, in which the pigment is confined to the uppermost vertex of the pyramidal upper section of each capsule in this layer, and the unshuttered state shown in FIG. 12D, in which the yellow pigment covers the whole of the flat lower surface of each capsule. The second electro-optic layer of the display shown in FIGS. 12C and 12D contains a cyan pigment and is not state-stable. The cyan pigment in this layer can be moved between the two shuttered positions shown in FIGS. 12C and 12D, in which the pigment is confined to the uppermost and lowermost vertices of each capsule, and an unshuttered position (not shown) in which the pigment is distributed uniformly throughout each capsule. The third electro-optic layer of the display contains a magenta pigment which can be moved vertically (as illustrated) between the unshuttered position shown in FIG. 12C and the shuttered position shown in FIG. 12D. The upper electrode shown in FIGS. 12C and 12D is provided with a white reflector.

As already indicated, in one aspect the present invention provides a variable transmission electrophoretic medium comprising a plurality of different organic pigments in a fluid, such that when all the pigments are dispersed substantially uniformly through the fluid, the medium appears substantially black. Also, the medium is substantially free from polymeric additives in the fluid (other than charge control or similar agents, and, surfactants) but still has a high degree of image stability. In a preferred form of such a variable transmission medium, the pigments are chosen to have substantial different dielectrophoretic mobilities, so that by manipulating the frequency and voltage applied to the electrophoretic medium, each pigment individually can be made to be in a dispersed state or in a packed state, and the medium can display a substantial color gamut.

As is well known to those skilled in the pigment art, a blend of two or more color pigments can be made to provide additional colors, including black. A broad range of color pigments has been developed for demanding applications such as automotive paints, and some of these pigments have demonstrated suitable properties for VT media. Pigments of the quinacridone and phthalocyanine families have been found useful. Such pigments can be blended to yield in total a very broad color gamut, but the added constraint of requiring black to be part of the gamut has hitherto diminished the color gamut achievable in a single medium.

Somewhat unexpectedly, it has been found that that some of the pigments useful in VT media have been found to display a wide range of electrophoretic mobilities in the sense of differing responses to a wide range of applied frequencies and voltages. Accordingly, by manipulating the frequency and voltage applied to the electrophoretic medium, each pigment individually can be made to be in a dispersed state or in a packed state, i.e., the different organic pigments can be made to "shutter" independently of one another. The dispersed state allows the pigment to absorb the transmitted light, the more uniform the dispersion, the better the absorption. The packed state minimizes the areal fraction of the medium where the pigment is located, thereby minimizing the absorption by that pigment. If all the pigments are packed, then the medium will assume its "open" or substantially transparent optical state. If, on the other hand, all the pigments are dispersed throughout the fluid, the medium will assume a substantially black optical state, provided with amounts and colors of the various pigments are balanced to achieve a neutral color. If at least one pigment is dispersed and at least one pigment is packed, the color of the medium will approach the color of the dispersed pigment, and by independent control of the state of dispersion of the various pigments, a substantial gamut of colors can be produced; for reasons which will be familiar to those skilled in the color imaging art, it is normally preferred that such a VT medium contain at least three different pigments having differing colors and dielectrophoretic mobilities.

The displays of the present invention can, as already discussed, make use of various driving methods to drive three separate pigments (whether those pigments be present in one, two or three separate electro-optic layers). Perhaps surprisingly, it is possible to drive three separate pigments substantially independently of one another using only a single set of electrodes and DC voltages. Conceptually, the methods for driving three different pigments using only DC and a single set of electrodes, may be summarized as follows:

Assume that there are three color-forming layers (although the principle does not require layers) with the following properties:
 (a) Layer 1 has a voltage (or impulse) threshold, is state stable, and its color depends upon the polarity of the applied voltage;
 (b) Layer 2 has either a lower threshold or no threshold, is state stable, and its color depends upon the polarity of the applied voltage; and
 (c) Layer 3 has no threshold, is not state stable, and switches faster than layer 2. Layer 3 reaches the same state whether driven with a positive or a negative impulse and relaxes to its opposite extreme when no potential is applied.

Given these three conditions, the drive scheme is:
 (a) Use a high voltage to set layer 1 to the desired color. In practice, this could be binary and in this case should be yellow. This will also affect layers 2 and 3.
 (b) Use a lower voltage to set layer 2 to the desired color. This will not affect layer 1, and will switch layer 3 to its extreme state.
 (c) Allow layer 3 to relax to its desired color and keep it there with a holding voltage (or pulses at any voltage).

The alternative to this, if all three layers are state stable, is the more straightforward scheme of addressing sequentially at three different voltages for the three colors and correcting the collateral switching of the faster layers when addressing the slower ones. In this case the slowest layer is addressed first, and layers 1 and 2 each have a threshold. However, this is much harder to engineer.

The following Examples are now given, though by way of illustration only, to show details of preferred reagents, conditions and techniques used in the media of the present invention.

Example 1

First Medium Containing Red, Green and Blue Pigments

The pigments used in this Example were:
Clariant Hostaperm Pink E 02, a red quinacridone pigment (available commercially from Clariant Corporation, 4000 Monroe Road, Charlotte N.C. 28205), stated by the manufacturer to have a specific gravity of 1.45, a surface area of 77 $m^2$/g, and an average particle size of 90 nm;
Clariant Hostaperm Green GNX, a green copper phthalocyanine pigment from the same manufacturer, and stated by the manufacturer to have a specific gravity of 2.05, a surface area of 40 m²/g, and an average particle size of 50 nm; and Clariant Hostaperm Blue B2G-D, a blue copper phthalocyanine pigment from the same manufacturer, and stated by the manufacturer to have a specific gravity of 1.6, a surface area of 44 m²/g, and an average particle size of 75 nm.

Millbases of each pigment containing approximately 20 percent by weight of the pigment in d-limonene and 0.0044 g of Solsperse 17000 per square meter of pigment surface area (as stated by the manufacturer) were prepared substantially as described in the aforementioned 2007/0146310. Samples of each millbase were diluted to 0.01 weight percent pigment with d-limonene and the resultant dispersion measured for color transmission with a Minolta CM-3600d spectrometer using 2 mm path length sample cuvettes. The millbases were also blended to produce a mixed dispersion having a color as close to black as possible (i.e., having the smallest possible a* and b* values in the conventional CIE L*a*b* color space). The results are shown in Table 1 below.

TABLE 1

| Color (saturated) | L* | a* | b* | % R | % G | % B |
|---|---|---|---|---|---|---|
| Red | 37.1 | 55.7 | −17.4 | 100 | 0 | 0 |
| Green | 21.1 | 10.1 | −28.5 | 0 | 100 | 0 |
| Blue | 22.2 | 22.6 | −17.6 | 0 | 0 | 100 |
| Black | 31.0 | 0 | −17.1 | 43.2 | 0 | 56.8 |

Note that the "black" blend actually tended to green even without adding any green pigment; this was caused by the blue-green hue of the "blue" pigment.

Example 2

Second Medium Containing Red, Green and Blue Pigments

Example 1 was repeated except that Clariant Ink Jet Magenta E02 VP 2621, a quinacridone pigment having an average particle size of 70 nm, was substituted for the pink pigment used in Example 1. Again, the millbases were also blended to produce a mixed dispersion having a color as close to black as possible. The results are shown in Table 2 below.

TABLE 2

| Color (saturated) | L* | a* | b* | % R | % G | % B |
|---|---|---|---|---|---|---|
| Red | 39.6 | 45.6 | −17.6 | 100 | 0 | 0 |
| Green | 21.1 | 10.1 | −28.5 | 0 | 100 | 0 |
| Blue | 22.2 | 22.6 | −17.6 | 0 | 0 | 100 |
| Black | 31.0 | 0 | −16.9 | 47.4 | 0 | 52.6 |

Again, the blended "black" tended to green, and since a suitable alternative blue pigment could not be located, it was determined that a major change in the pigment set was necessary.

Example 3

Medium Containing Green, Violet and Yellow Pigments

Example 1 was repeated except that the pink and blue pigments were replaced with Clariant Hostaperm Violet RL02 and Clariant Novoperm Yellow 4G VP2532 from the same manufacturer. The former is a dioxazine pigment stated by the manufacturer to have a specific gravity of 1.49, a surface area of 80 m²/g, and an average particle size of 50 nm, while the latter is a disazo pigment stated by the manufacturer to have a specific gravity of 1.44, a surface area of 33 m²/g, and an average particle size of 162 nm. Again, the millbases were also blended to produce a mixed dispersion having a color as close to black as possible. The results are shown in Table 3 below.

TABLE 3

| Color (saturated) | L* | a* | b* | % G | % P | % Y |
|---|---|---|---|---|---|---|
| Green | 21.1 | 10.1 | −28.5 | 100 | 0 | 0 |
| Purple | 30.4 | 4.2 | 20.8 | 0 | 100 | 0 |
| Yellow | 46.2 | −2.7 | 85.2 | 0 | 0 | 100 |
| Black | 31.0 | 0 | 0 | 57.8 | 22.9 | 19.3 |

As may be seen from Table 3, the blend of this set of pigments produces a good, neutral black.

A polymer-dispersed electrophoretic medium was produced using this black blend in substantially the same manner as described in Example 1 of U.S. Pat. No. 6,866,760; the polymer-dispersed medium was coated on the indium-tin-oxide (ITO) coated surface of a polyethylene terephthalate/ITO film, dried, and adhesive layer applied, and the resultant film laminated to a rear electrode to produce an experimental single-pixel display, which were then driven at various combinations of drive voltages and frequencies.

In such a multi-pigment display, if all the pigments are packed, the display appears open (substantially transparent); if all the pigments are dispersed the display appears closed (substantially black). When the fractions of each pigment in its dispersed form is different from the overall proportion of that pigment in the display (i.e., different from the 57.8% green, 22.9% violet, 19.3% yellow shown in Table 3), then the display color approaches the color of the more dispersed pigment. For example, if the yellow pigment is well dispersed, and the green and purple pigments are packed, the display will appear yellow. Alternatively, if the yellow and green pigments are dispersed and only the purple is packed, the display will appear yellow-green. Table 4 below gives examples of applied waveforms and the corresponding colors produced.

TABLE 4

| Color | L* | a* | b* | Waveform |
|---|---|---|---|---|
| OPEN | 53.0 | −4.2 | 4.9 | 120 V, 5 kHz sine wave |
| CLOSED | 24.7 | −3.3 | −2.5 | 120 V, 60 Hz sine wave |
| GREEN | 42.2 | −25.9 | 8.2 | 120 V, 0.5 Hz square wave |
| YELLOW | 47.0 | −5.8 | 16.7 | Open, then 10 ms bursts of 2 kHz sine wave, 0.5 seconds apart |
| BLUE | 26.6 | 0.2 | −13.3 | 120 V, 1.2 kHz sine wave |

Figure 17:
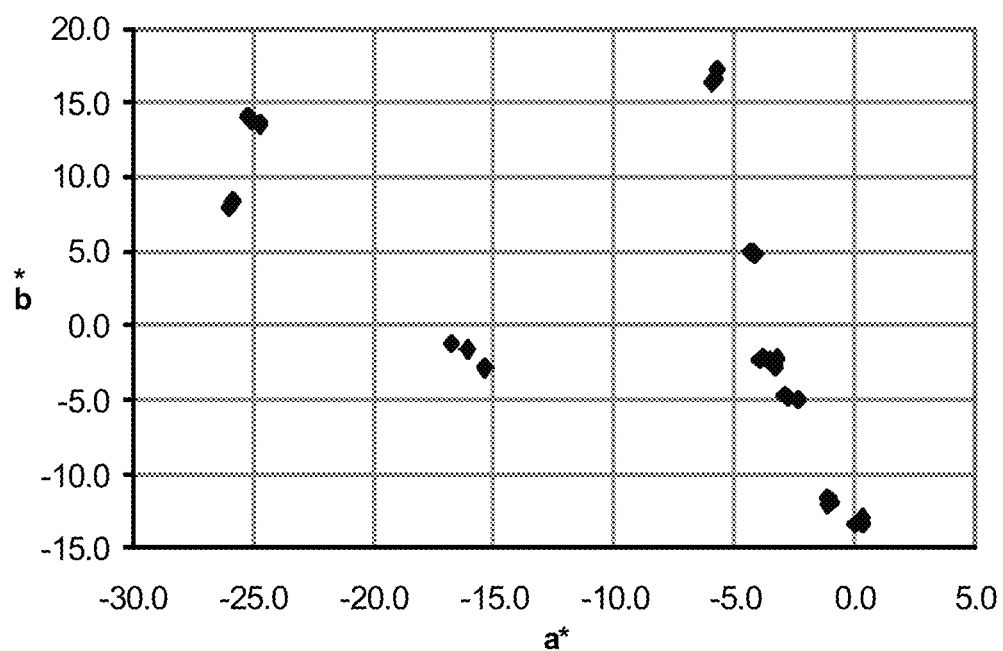
FIG. 17 illustrates the colors obtained in Example 3 below.

The above colors, and others produced using different waveforms, are plotted in the a*b* plane in FIG. 17 of the accompanying drawings. The colors were measured with an Eye-One spectrophotometer in reflective mode with a white background placed behind the sample. The white background was treated as the reference white-point for the L*a*b* calculations.

It will be seem from the Figure that the experimental display was capable of displaying a substantial color gamut, though only in the green/yellow/blue portion of the a*b* plane; this particular display was not capable of producing a positive a* (i.e., a red color). However, in view of the substantial color gamut capable of being displayed by this experimental display, and the wide range of pigments commercially available and suitable for incorporation in such a display it can be anticipated that evaluation of additional pigments and further work in formulation will produce displays have a broader color gamut more centered in the a*b* plane.

Example 4

Coating Slurry for Cyan Shuttering Capsules

A cyan pigment, Irgalite Blue GLVO (available from BASF, Ludwigshafen, Germany) (8 g) was combined with Isopar E (12 g) and a solution of Solsperse 17000 (available from Lubrizol Corporation, Wickliffe, Ohio, 20 g of a 20% w/w solution in Isopar E) and the mixture was dispersed by stirring with beads to afford a cyan pigment dispersion.

The cyan pigment dispersion thus prepared (5.75 g) was combined with Isopar E (109.25 g) and the resultant mixture mechanically rolled overnight to produce an internal phase ready for encapsulation. The internal phase so prepared was then encapsulated following the procedure described in U.S. Pat. No. 7,002,728. The resultant encapsulated material was isolated by sedimentation, washed with deionized water, and size separated by sieving, using sieves of 45 and 20 µm mesh. Analysis using a Coulter Multisizer showed that the resulting capsules had a mean size of 40 µm and more than 85 percent of the total capsule volume was in capsules having the desired size of between 20 and 60 µm.

The resulting capsule slurry was adjusted to pH 9 and excess water removed. The capsules were then concentrated and the supernatant liquid discarded. The capsules were mixed with an aqueous polyurethane binder (prepared in a manner similar to that described in U.S. Patent Application No. 2005/0124751) and small amounts of Triton X-100 surfactant and hydroxypropylmethyl cellulose were added and mixed thoroughly to provide a slurry ready for use in a display, as described in detail below.

Example 5

Coating Slurry for Cyan Shuttering Capsules Containing 1% w/w of Pigment

Irgalite Blue GLVO (26 g) was combined with Isopar E (70 g) and a solution of Solsperse 17000 (70 g of a 20% w/w solution in Isopar E) and the mixture was dispersed in an attritor with glass beads to produce a cyan pigment dispersion. The cyan pigment dispersion thus prepared (5.75 g) was combined with Isopar E (109.25 g). The resultant mixture was mechanically rolled overnight to produce an internal phase ready for encapsulation. The internal phase so prepared was then encapsulated following the procedure of Example 4 above to produce capsules having a mean size of 40 µm and with more than 85 percent of the total capsule volume in capsules having the desired size of between 20 and 60 µm. The capsules were then incorporated into a coating slurry in the same way as in Example 4 above.

Example 6

Coating Slurry for Magenta Shuttering Capsules

A magenta pigment, Quindo Red 19 (available from Sun Chemical Corporation, Parsippany, N.Y.) was provided with a poly(lauryl methacrylate) coating substantially as described in U.S. Pat. No. 7,002,728. The coated pigment (13 g) was then combined with Isopar E (30 g) to produce a magenta pigment dispersion, which was filtered through a 200 µm mesh film and the percent solids determined to be 17%.

The magenta pigment dispersion thus prepared (13 g) was combined with Isopar E (88 g) and Solsperse 17000 (8 g of a 20% w/w solution in Isopar E), and the resultant mixture was rolled mechanically overnight to produce an internal phase ready for encapsulation. The internal phase so prepared was then encapsulated as described in Example 4 above to produce capsules having a mean size of 40 µm and with more than 85 percent of the total capsule volume in capsules having the desired size of between 20 and 60 µm. The capsules were then incorporated into a coating slurry in the same way as in Example 4 above.

Example 7

Coating Slurry for Magenta/White Vertically Switching Capsules

Functionalized magenta pigment (10 g, prepared as described in Example 6 above) was combined with Isopar E (40 g) and the resultant mixture dispersed by stirring with beads to produce a magenta pigment dispersion, which was filtered through a 200 µm mesh film and the percent solid determined. This dispersion (18.82 g) was combined with titanium dioxide (R794 available from E. I. du Pont de Nemours Corporation, Wilmington, Del.) (70.57 g of a 60% w/w dispersion treated as described in U.S. Pat. No. 7,002,728), minor amounts of Solsperse 17000 and poly(isobutylene) of molecular weight 600,000, and additional amounts of Isopar E. The resultant mixture was rolled mechanically overnight to produce an internal phase ready for encapsulation. The infernal phase so prepared was then encapsulated as described in Example 4 above to produce capsules having a mean size of 40 µm and with more than 85 percent of the total capsule volume in capsules having the desired size of between 20 and 60 µm. The capsules were then incorporated into a coating slurry in the same way as in Example 4 above.

Example 8

Coating Slurry for Yellow/White Vertically Switching Capsules

A yellow pigment, Paliotan Yellow L 1145 (available from BASF), was surface-treated with N-[3-(trimethoxysilyl)propyl]-N'-(4-vinylbenzyl)ethylenediamine hydrochloride, followed by provision of a poly(lauryl methacrylate) coating substantially as described in U.S. Pat. No. 7,002,728. This yellow pigment (30 g) was combined with Isopar E (70 g) and sonicated for 2 hours and mechanically rolled overnight. The resultant dispersion (45.6 g) was then combined with the same R794 titanium dioxide as in Example 7 (102.6 g of a 60% w/w dispersion) minor amounts of Solsperse 17000 and poly(isobutylene) of molecular weight 850,000, and additional amounts of Isopar E. The resultant mixture was rolled mechanically overnight to produce an internal phase ready for encapsulation. The internal phase so prepared was then encapsulated as described in Example 4 above to produce capsules having a mean size of 40 µm and with more than 85 percent of the total capsule volume in capsules having the desired size of between 20 and 60 µm. The capsules were then incorporated into a coating slurry in the same way as in Example 4 above.

Example 9

Coating Slurry for Capsules Containing No Pigment

A solution of Solsperse 17000 in Isopar E) was rolled mechanically overnight to produce an internal phase ready for encapsulation. The internal phase so prepared was then encapsulated as described in Example 4 above to produce capsules having a mean size of 40 µm and with more than 85 percent of the total capsule volume in capsules having the desired size of between 20 and 60 µM. The capsules were then incorporated into a coating slurry in the same way as in Example 4 above.

Example 10

Assembly and Switching of a Cyan/Yellow Bichrome Display

The cyan shuttering capsule slurry prepared in Example 4 above was coated on to a 125 µm poly(ethylene terephthalate) (PET) film bearing a printed hexagonal grid metallic electrode of 50 µm pitch and 1 µm line width using a bar coater with a 50 µm gap. The coating was dried at 60° C., following which a second coating of capsules was applied using the yellow/white vertical switching capsule slurry prepared as described in Example 8 above, with a bar coater gap of 100 µm. The second coating layer was dried at 60° C. A layer of polyurethane adhesive doped with a tetraalkylammonium salt, pre-coated onto a release sheet, was laminated on top of the second layer of capsules as described in U.S. Pat. No. 7,002,728. The release sheet was removed and the resultant multilayer structure was laminated onto a graphite rear electrode. As finally assembled the display structure comprised, in order from its viewing surface, a first layer of PET film base, a second layer of patterned electrode, a third layer of cyan shuttering capsules, a fourth layer of yellow/white vertically switching capsules, a fifth layer of a conductively doped lamination adhesive, and a sixth layer comprising a graphite rear electrode.

The display structure so produced was driven by applying a square wave AC signal at 30 Hz and +/−10 V that was offset by DC voltages that ranged from 40 V to −40 V. As the display was driven it was illuminated by a tungsten ring-light source and light reflected from the display was analyzed spectrophotometrically, giving the L*a*b* values shown in Table 5 below.

TABLE 5

| Time (s) | Offset Voltage | L* | a* | b* |
| --- | --- | --- | --- | --- |
| 1 | 40 | 47.83 | −22.68 | −22.03 |
| 2 | 30 | 49.11 | −21.02 | −20.92 |
| 3 | 20 | 49.24 | −21.07 | −21.20 |
| 4 | 10 | 48.53 | −22.38 | −22.52 |
| 5 | 0 | 41.32 | −37.16 | −33.34 |
| 6 | −10 | 41.67 | −35.22 | −7.91 |
| 7 | −20 | 44.86 | −29.27 | 6.13 |
| 8 | −30 | 46.81 | −27.42 | 8.74 |
| 9 | −40 | 47.86 | −25.45 | 9.46 |
| 10 | −30 | 48.27 | −24.84 | 10.14 |
| 11 | −20 | 48.29 | −24.97 | 10.16 |
| 12 | −10 | 47.42 | −26.88 | 9.60 |
| 13 | 0 | 41.09 | −42.04 | 2.31 |
| 14 | 10 | 41.84 | −36.48 | −15.86 |
| 15 | 20 | 46.37 | −25.72 | −21.39 |
| 16 | 30 | 48.33 | −22.44 | −21.64 |
| 17 | 40 | 49.11 | −21.16 | −20.17 |
| 18 | 30 | 49.31 | −20.89 | −19.84 |
| 19 | 20 | 49.26 | −21.10 | −20.09 |
| 20 | 10 | 48.60 | −22.24 | −21.40 |
| 21 | 0 | 41.77 | −36.03 | −31.51 |

Figure 13A:
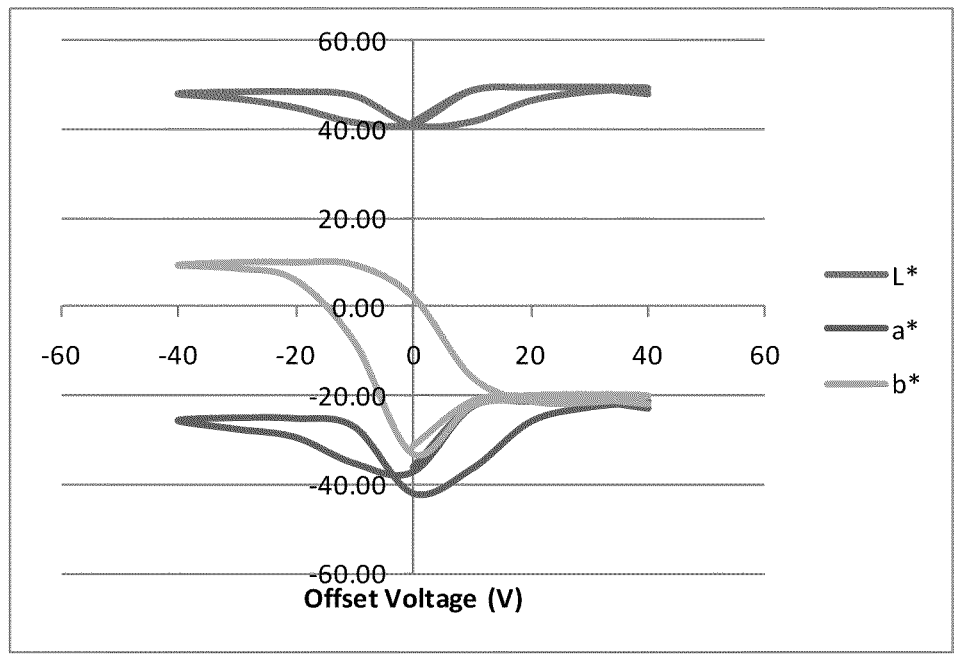
FIGS. 13A and 13B illustrate the color performance of the display tested in Example 10 below.
Figure 13B:
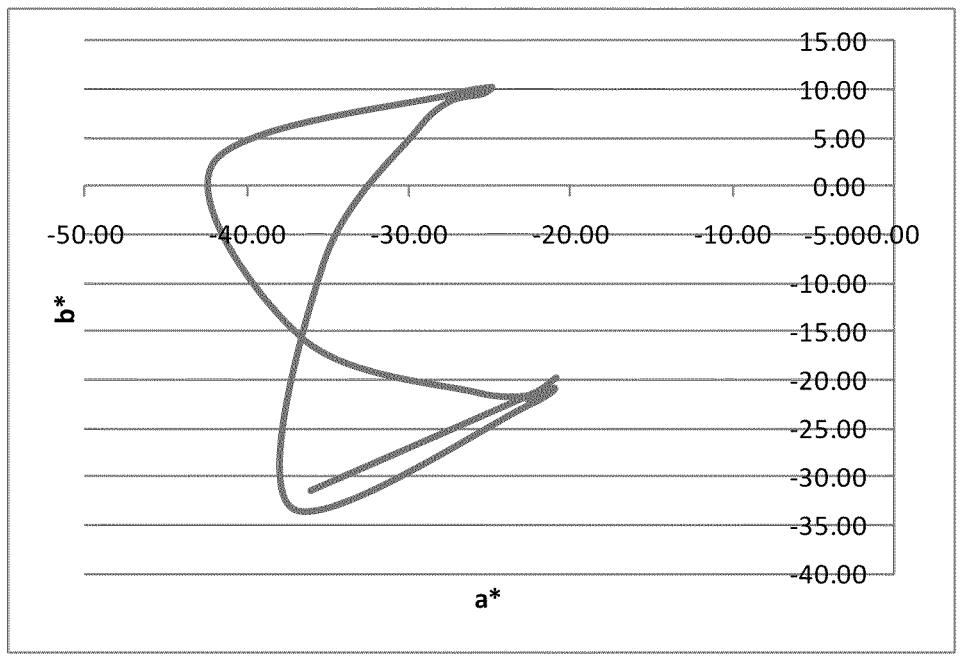

These results are shown graphically in FIGS. 13A and 13B. FIG. 13A shows the L*, a* and b* values as a function of the DC offset applied to the 30 Hz AC drive at the top-plane, transparent electrode. Note that similar states are obtained with a simple DC drive, without the 30 Hz AC component, although the resultant states are slightly inferior.

This display operates as shown in FIGS. 8A-8D. The first layer of capsules, in contact with the concentrator electrodes on the top-plane side and with the second layer of capsules on the other, contains a positively-charged cyan pigment. When the DC offset is positive, the cyan pigment is shuttered at the junction between the first layer of capsules and the second layer of capsules (as shown in FIG. 8C). When the DC offset is negative, the cyan pigment collects at the concentrator electrodes (as shown in FIG. 8A). As the DC offset moves towards zero the pigment moves away from the shuttered state. The hysteresis loop seen in the a* value in FIG. 13A reflects these changes (less negative a* corresponds to the shuttered cyan pigment). There is a slight hysteresis, as the movement of pigment towards the shuttered state as the DC offset is increased is faster than the movement away from the shuttered state as the DC offset is decreased.

The vertically-switching capsules (i.e., capsules in which the particles move parallel to the applied electric field) in the second capsule layer contain a positively-charged yellow pigment and a negatively-charged white pigment, and thus when the top-plane is negatively charged this layer of capsules displays a yellow image (positive b*) and when the top-plane is positively charged a white image (negative b* because of the blue component in the overlying cyan layer).

The a*/b* plot shown in FIG. 13B corresponds experimentally to that shown conceptually in FIG. 9B.

Example 11

Assembly and Driving of a Cyan/Magenta Bichrome Display in which a Layer of Pigment-Less Capsules is Used to Direct Shuttering The display produced in this Example has the structure shown in FIG. 12A.

The pigment-less capsule slurry prepared in Example 9 above was coated on to a PET film having a transparent, conductive coating of indium tin oxide (ITO) and dried using the same conditions as the first layer of capsules in Example 10 above. A second coating of capsules was applied using the cyan shuttering capsule slurry prepared in Example 5, above, with a bar coater gap of 80 µm, and the coating was dried at 60° C. A third coating of capsules was applied using the magenta/white vertical switching capsule slurry prepared in Example 7 above using a bar coater gap of 100 µm to form a third capsule layer, which was dried at 60° C. An adhesive layer was laminated on top of the third layer of capsules in the same manner as in Example 10 above. The release sheet was removed and the resultant multilayer structure was laminated onto a graphite rear electrode. As finally assembled the display structure comprised, in order from its viewing surface, a first layer of PET film base, a second layer of an unpatterned, continuous transparent electrode, a third layer of pigment-less capsules, a fourth layer of cyan shuttering capsules, a fifth layer of magenta/white vertically switching capsules, a sixth layer of adhesive, and a seventh layer comprising the graphite rear electrode.

The display structure so produced was driven by applying a square wave AC signal at 30 Hz and +/−10 V that was offset by DC voltages that ranged from 40 V to −40 V. As the display was driven it was illuminated by a tungsten ring-light source and light reflected from the display was analyzed spectrophotometrically, giving the L*a*b* values shown in Table 6 below.

TABLE 6

| Time (s) | Offset Voltage | L* | a* | b* |
|---|---|---|---|---|
| 1 | 40 | 47.55 | −29.33 | −41.46 |
| 2 | 30 | 49.64 | −25.95 | −38.86 |
| 3 | 20 | 49.35 | −25.66 | −38.95 |
| 4 | 10 | 48.27 | −26.97 | −40.10 |
| 5 | 0 | 44.22 | −34.81 | −46.48 |
| 6 | −10 | 39.55 | −30.70 | −45.24 |
| 7 | −20 | 31.31 | −5.77 | −37.80 |
| 8 | −30 | 31.21 | 4.53 | −33.22 |
| 9 | −40 | 32.80 | 5.97 | −31.11 |
| 10 | −30 | 32.88 | 5.63 | −30.99 |
| 11 | −20 | 32.32 | 4.83 | −31.93 |
| 12 | −10 | 31.22 | 3.01 | −33.67 |
| 13 | 0 | 28.32 | −2.14 | −37.97 |
| 14 | 10 | 29.82 | −6.63 | −38.78 |
| 15 | 20 | 41.69 | −20.62 | −40.66 |
| 16 | 30 | 48.19 | −23.62 | −39.06 |
| 17 | 40 | 50.44 | −23.52 | −37.55 |
| 18 | 30 | 50.43 | −23.76 | −37.58 |
| 19 | 20 | 49.76 | −24.34 | −38.09 |
| 20 | 10 | 48.60 | −25.70 | −39.86 |
| 21 | 0 | 44.52 | −33.51 | −45.99 |

Figure 14A:
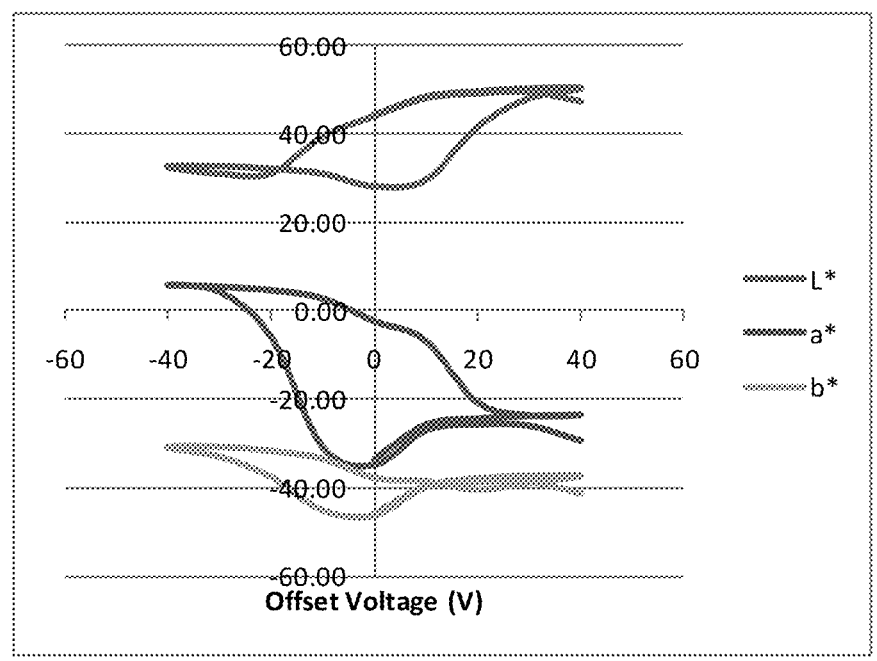
FIGS. 14A and 14B illustrate the color performance of the display tested in Example 11 below.
Figure 14B:
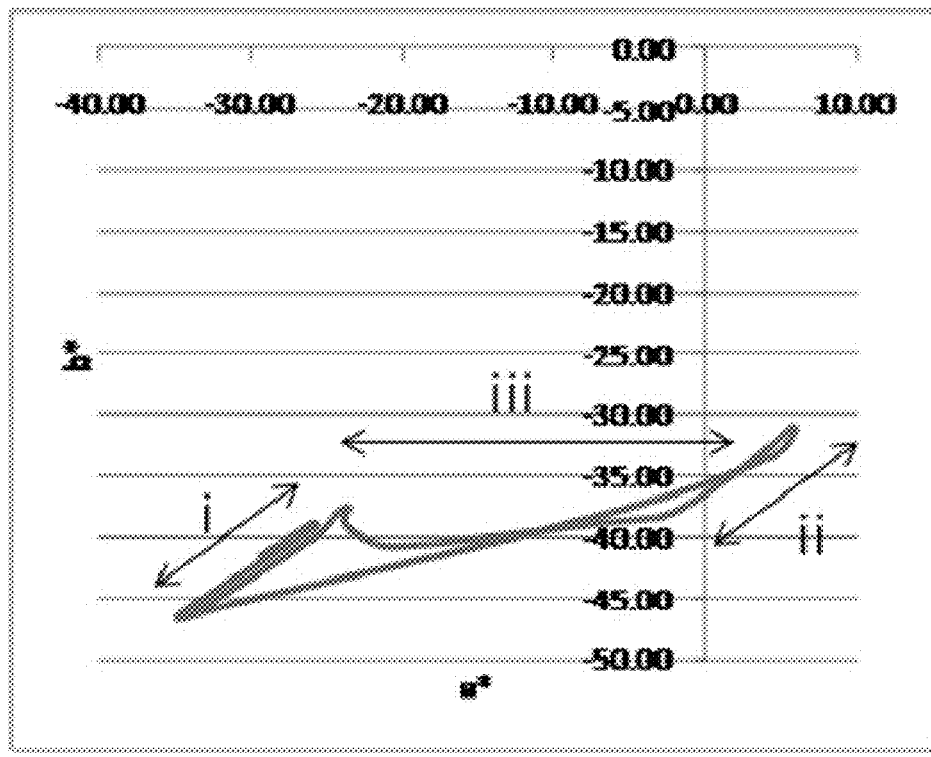

These results are shown graphically in FIGS. 14A and 14B. FIG. 14A shows the L*, a* and b* values as a function of the DC offset applied to the 30 Hz AC drive at the top-plane, transparent electrode. Note that, as was the case in Example 10 above, similar states are obtained with a simple DC drive, without the 30 Hz AC component, although the resultant states are slightly inferior.

The display operates as follows. The second layer of capsules, in contact with the pigment-less capsules on one side and with the third layer of capsules on the other, contains a positively-charged cyan pigment and shutters as shown conceptually in FIG. 4. When the DC offset is positive, the cyan pigment is shuttered at the junction between the second layer of capsules and the third layer of capsules. When the DC offset is negative, the cyan pigment is shuttered at the junction between the second layer of capsules and the first layer of (pigment-less) capsules. The shuttering of the cyan pigment is most easily seen in the a*/b* plot shown in FIG. 14B, in which arrow i corresponds to the movement between shuttered and unshuttered cyan pigment when the top-plane is positively charged and arrow ii corresponds to the movement between shuttered and unshuttered cyan pigment when the top plane is negatively charged.

The vertically-switching capsules contain a positively-charged magenta pigment and a negatively-charged white pigment, and thus when the top plane is negatively charged this layer of capsules displays a magenta image (more positive a*) and when positive a white image (more negative a*). This switching corresponds to arrow iii in FIG. 14B.

Example 12

Cyan/Magenta/Yellow Trichrome Display as Per FIG. 12a

The first two coating steps of Example 10 above were repeated using the magenta shuttering capsule slurry prepared in Example 6 above for the first coated layer and the cyan shuttering capsule slurry prepared in Example 5 above for the second coated layer, except that in the second coating the bar coater gap was 80 µm. Next, the yellow/white vertical switching capsule slurry prepared in Example 8 above was applied with a bar coater gap of 100 µm to form a third capsule layer, which was dried at 60° C. An adhesive layer was laminated on top of the third layer of capsules, the release sheet removed and the remaining layers laminated on to a graphite rear electrode, all as in Example 10. As finally assembled the display structure comprised, in order from the viewing surface, a first layer of PET film base, a second layer of patterned electrode, a third layer of magenta shuttering capsules, a fourth layer of cyan shuttering capsules, a fifth layer of yellow/white vertically switching capsules, a sixth layer of a conductively doped lamination adhesive, and a seventh layer comprising a graphite rear electrode.

The display structure was driven, illuminated and the light reflected therefrom analyzed, all in the same manner as in Example 10. The results are shown in Table 7 below.

TABLE 7

| Time (s) | Offset Voltage | L* | a* | b* |
|---|---|---|---|---|
| 1 | 40 | 47.48 | 16.47 | −4.23 |
| 2 | 20 | 48.75 | 15.92 | −3.60 |
| 3 | 10 | 48.15 | 16.30 | −3.88 |
| 4 | 5 | 46.92 | 16.95 | −4.92 |
| 5 | 0 | 42.25 | 17.44 | −9.20 |
| 6 | −5 | 39.03 | 12.09 | −8.61 |
| 7 | −10 | 39.68 | 11.03 | 8.37 |
| 8 | −20 | 42.35 | 9.32 | 19.65 |
| 9 | −40 | 46.18 | 6.57 | 24.16 |
| 10 | −20 | 46.33 | 6.44 | 24.11 |
| 11 | −10 | 45.27 | 7.52 | 23.62 |
| 12 | −5 | 43.35 | 9.36 | 21.91 |
| 13 | 0 | 39.31 | 10.41 | 18.79 |
| 14 | 5 | 37.75 | 8.03 | 16.43 |
| 15 | 10 | 42.03 | 11.98 | 13.69 |
| 16 | 20 | 46.61 | 14.71 | 5.12 |
| 17 | 40 | 49.76 | 13.57 | −0.67 |
| 18 | 20 | 50.09 | 13.55 | −1.86 |
| 19 | 10 | 49.37 | 14.05 | −2.72 |
| 20 | 5 | 47.99 | 14.97 | −3.76 |
| 21 | 0 | 43.20 | 16.23 | −7.40 |

Figure 15A:
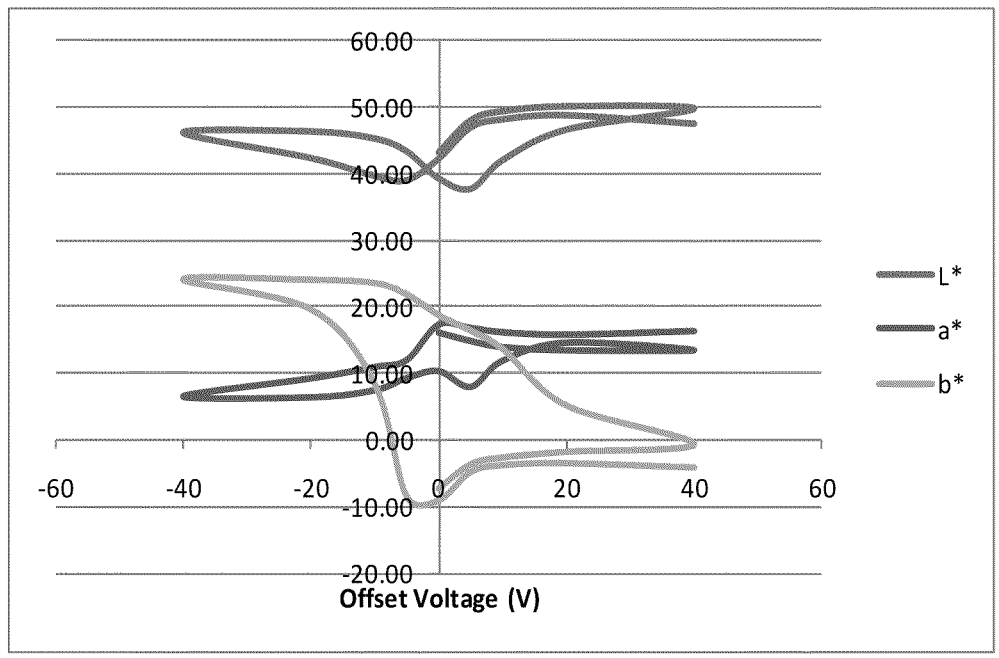
FIGS. 15A and 15B illustrate the color performance of the display tested in Example 12 below.
Figure 15B:
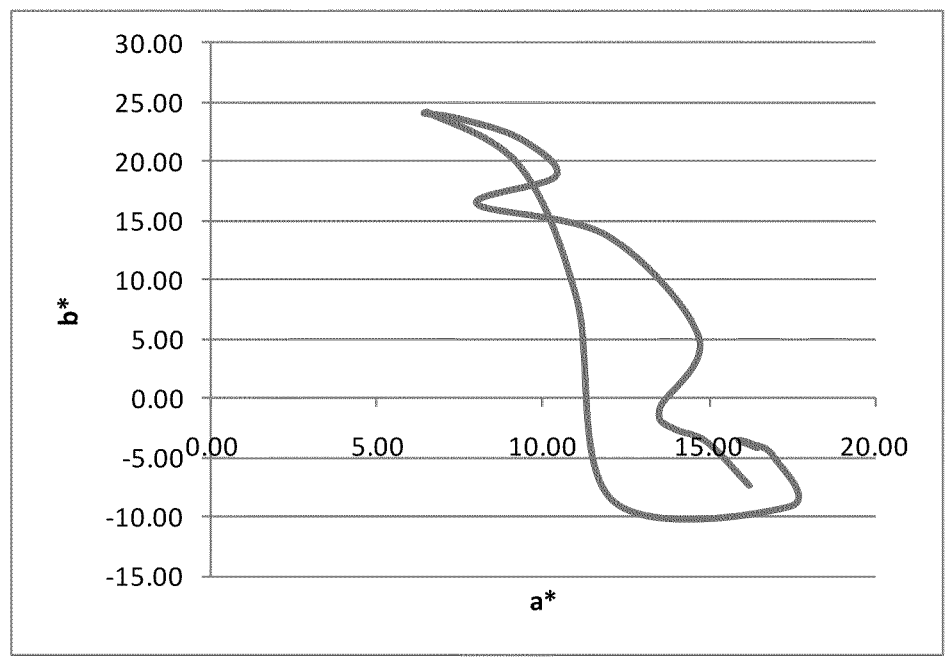

These results are shown graphically in FIGS. 15A and 15B which are directly comparable to the FIGS. 13A and 13B respectively. It can be seen that a wide range of colors is addressable by the display. The colors are offset along the a* axis, indicating that the magenta shutter is not fully closing. Such an offset may be corrected by applying a uniform color filter to the entire display.

Example 13

Bichrome Display Using a Single Applied Voltage and Time Modulation

A display was prepared essentially as described in Example 11 above, except that the ITO coating on the PET was pretreated with a composition comprising an ionic dopant prior to application of the pigment-less capsule layer. This display was addressed by using the waveform shown in Table 8 below.

TABLE 8

| Start time | End time | Voltage (V) | FIG. 16A ref. |
|---|---|---|---|
| 0 | 2 | −30 | a |
| 2 | 4 | 0 | b |
| 4 | 6 | 30 | c |
| 6 | 8 | 0 | d |
| 8 | 8.2 | −30 | e |
| 8.2 | 10.2 | 0 | f |

Figure 16:
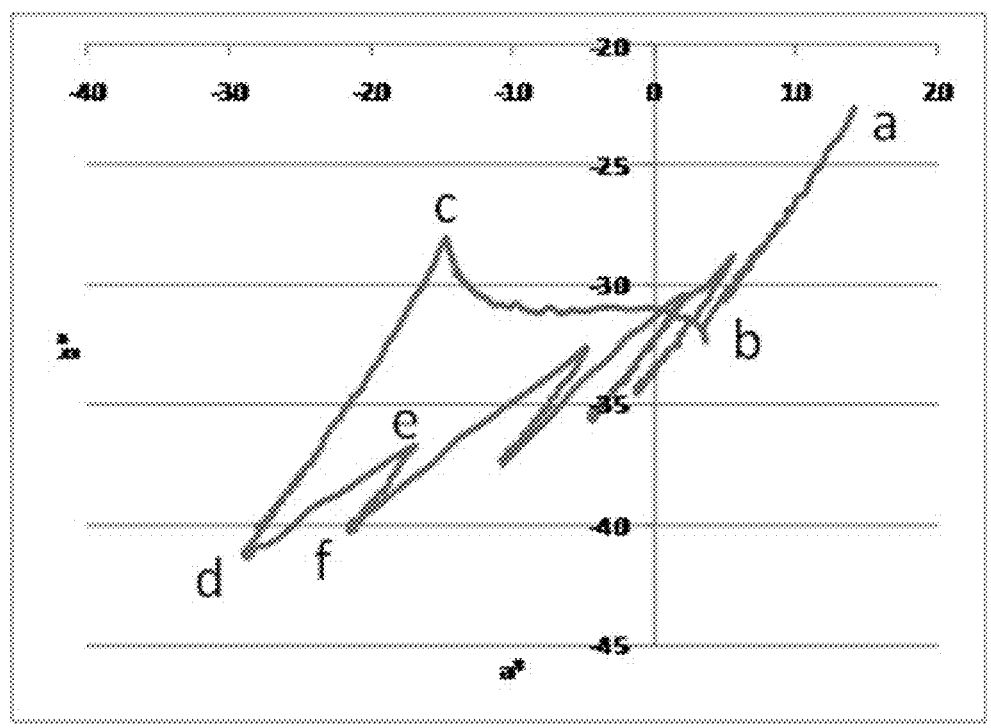
FIG. 16 (which is similar to FIGS. 13B, 14B and 15B) illustrates the color performance of the display tested in Example 13 below.

The drive continued with pulses at 30V of 200 ms length followed by rests of 2 seconds in length. The colors produced by the display are shown in FIG. 16, in which the letters correspond to those in the last column of Table 8. A negative voltage shutters the cyan pigment and switches the magenta/white capsules to magenta, corresponding to position a in FIG. 16. As the voltage is held at zero, the magenta/white capsules, being state-stable, remain in the magenta state but the cyan shutter, not being state-stable, relaxes to the cyan state from the clear state, corresponding to position b in FIG. 16. A positive voltage then switches the cyan to the shuttered, clear state and the magenta to the white state, corresponding to position c in FIG. 16. As the voltage is held at zero, the magenta/white capsules, being state-stable, remain in the white state but the cyan shutter, not being state-stable, relaxes to the cyan state from the clear state, corresponding to position d in FIG. 16. Next the polarity of the drive is reversed, but the switching time is reduced to 200 ms in pulses separated by 2 second rests. The magenta/white capsules are incrementally switched from the white to the magenta state (since they are state-stable), whereas the cyan capsules partially shutter (position e) but relax to the non-shuttered state every time the voltage is reduced to zero (position f). This pattern repeats as the short pulses are continued.

From the foregoing discussion, it will be seen that the present invention provides variable transmission electrophoretic media capable of displaying multiple colors. When used as a variable color segmented overlay, the media of the present invention can provide a much broader color gamut than a conventional (static) color filter array. The present invention also provides a low haze monochrome variable transmission medium with high image stability.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising at least first, second and third layers of electro-optic material, the first layer being capable of displaying at least one optical state which cannot be displayed by the second layer, and the third layer being capable of displaying at least one optical state which cannot be displayed by the first and second layers, the display further comprising a first electrode disposed on one side of the first, second and third layers, and a second electrode disposed on the opposed side of the first, second and third layers from the first electrode, there being no electrode between the first and second layers or between the second and third layers; wherein the first, second and third layers of electro-optic materials are stacked directly on top of the first electrode; and wherein the second electrode is stacked directly on top of the third layer of electro-optic material.

2. An electro-optic display according to claim 1 wherein the three layers contain cyan, magenta and yellow pigments, in any order.

3. An electro-optic display according to claim 2 wherein the layer containing the yellow pigment is arranged to have a smaller number of gray levels than the layers containing the cyan and magenta pigments.

4. An electro-optic display according to claim 2 having a viewing surface through which an observer views the display, and wherein the two electro-optic layers closest to the viewing surface contain cyan and yellow pigments, in either order.

5. An electro-optic display according to claim 1 wherein at least one of the layers of electro-optic material comprises an electrophoretic material comprising a plurality of charged pigment particles dispersed in a fluid and capable of moving through the fluid on application of an electrical field to the layer.

6. An electro-optic display according to claim 5 wherein at least one of the first and second layers comprises a microcavity electrophoretic material.

7. An electro-optic display according to claim 5 wherein the charged particles in at least one of the layers are movable between a first optical state, in which the pigment particles occupy substantially the whole area of each pixel, and a second optical state, in which the pigment particles occupy only a minor proportion of the area of each pixel.

8. An electro-optic display according to claim 7 wherein the charged particles in each of the first and second layers are movable between a first optical state, in which the pigment particles occupy substantially the whole area of each pixel, and a second optical state, in which the pigment particles occupy only a minor proportion of the area of each pixel.

9. An electro-optic display according to claim 8 wherein the yield stresses of the fluids in the first and second layers differ.

10. An electro-optic display according to claim 8 wherein the sizes of the microcavities in the first and second layers differ.

11. An electro-optic display according to claim 8 wherein the particles in the first and second layers differ in at least one of size, shape and electrical conductivity.

12. An electro-optic display according to claim 8 wherein the fluids in the first and second layers differ in at least one of viscosity and electrical conductivity.

13. An electro-optic display according to claim 8 having a viewing surface at or adjacent the surface of the first electro-optic layer remote from the second electro-optic layer, the third electro-optic layer comprising first and second types of particles of differing colors disposed in a fluid and capable of moving through the fluid on application of an electric field to the third electro-optic layer, the first and second types of particles being of differing electrophoretic mobility.

14. An electro-optic display according to claim 13 wherein the first type of particles in the third electro-optic layer are white.

15. An electro-optic display according to claim 14 wherein the particles in the first and second electro-optic layers are yellow and cyan, in either order, and the second type of particles in the third electro-optic layer are magenta.

16. An electro-optic display according to claim 1 wherein at least one of the first and second electrodes occupies only a minor proportion of the area of a pixel.

17. An electro-optic display according to claim 6 wherein the walls of the microcavity have a higher electrically conductivity than the phase comprising the plurality of charged pigment particles dispersed in the fluid.

18. An electro-optic display according to claim 1 wherein one of the electro-optic layers has at least two stable states, and the second electro-optic layer has only one stable state.

19. An electro-optic display comprising first and second layers of cavities disposed adjacent one another with no electrode between the first and second layers, the sections of each of first and second layers of cavities lying adjacent the other layer being of substantially pyramidal form tapering towards the other layer, at least one of the first and second layers comprising colored particles dispersed in a fluid and capable of moving through the fluid on application of an electric field to the display; wherein the first and second layers of electro-optic materials are stacked directly on top of the first electrode; and wherein the second electrode is stacked directly on top of the second layer of electro-optic material.

20. An electro-optic display according to claim 19 wherein the first and second layers are formed of deformable capsules.

21. An electro-optic display according to claim 19 wherein one of the first and second layers is free from colored particles.

22. An electro-optic display comprising at least first, second and third layers of electro-optic material, the display further comprising a first electrode disposed on one side of the first, second and third layers, and a second electrode disposed on the opposed side of the first, second and third layers from the first electrode, there being no electrode between the first and second layers, or between the second and third layers, the first, second and third layers having the following properties:
  (a) the first layer 1 has a voltage and/or impulse threshold, is state stable, and its color depends upon the polarity of the applied voltage;
  (b) the second layer has either a lower threshold than the first layer, is state stable, and its color depends upon the polarity of the applied voltage; and
  (c) the third layer has no threshold, is not state stable, switches faster than the second layer, and reaches the same state whether driven with a positive or a negative impulse and relaxes to its opposite extreme when no potential is applied; wherein the first, second and third layers of electro-optic materials are stacked directly on top of the first electrode; and wherein the second electrode is stacked directly on top of the third layer of electro-optic material.

23. A method for driving an electro-optic display according to claim 22, the method comprising:
  (a) applying a high voltage to set the first layer to the desired color;
  (b) applying a lower voltage than in step (a) to set the second layer to the desired color; and
  (c) allowing the third layer to relax to its desired color.

* * * * *